(12) United States Patent
Smith et al.

(10) Patent No.: US 11,489,921 B2
(45) Date of Patent: *Nov. 1, 2022

(54) KICKSTART DISCOVERY CONTROLLER CONNECTION COMMAND

(71) Applicant: DELL PRODUCTS L.P., Round Rock, TX (US)

(72) Inventors: Erik Smith, Douglas, MA (US); Joseph LaSalle White, San Jose, CA (US); Pawan Kumar Singal, Milpitas, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/239,462

(22) Filed: Apr. 23, 2021

(65) Prior Publication Data

US 2021/0289029 A1    Sep. 16, 2021

Related U.S. Application Data

(63) Continuation-in-part of application No. 16/898,216, filed on Jun. 10, 2020, now Pat. No. 11,240,308, (Continued)

(30) Foreign Application Priority Data

Apr. 25, 2020   (IN) .............................. 202011017755

(51) Int. Cl.
*H04L 67/1097* (2022.01)
*H04L 67/1061* (2022.01)
(Continued)

(52) U.S. Cl.
CPC ........ *H04L 67/1097* (2013.01); *G06F 3/0604* (2013.01); *G06F 3/067* (2013.01);
(Continued)

(58) Field of Classification Search
CPC ............. H04L 41/0813; H04L 61/1511; H04L 61/1541; H04L 67/1097; H04L 12/4641;
(Continued)

(56) References Cited

U.S. PATENT DOCUMENTS

| 2018/0074717 A1 | 3/2018 | Olarig |
| 2018/0270119 A1 | 9/2018 | Ballapuram |

(Continued)

OTHER PUBLICATIONS

Notice of Allowance and Fee(s) Due dated Jul. 9, 2021, in related U.S. Appl. No. 16/898,216. (5pgs).

(Continued)

*Primary Examiner* — Glenn A. Auve
(74) *Attorney, Agent, or Firm* — North Weber & Baugh LLP

(57) ABSTRACT

Multicast Domain Name System (mDNS)-based pull registration systems and methods facilitate discovery in communication networks, such as Storage Area Networks (SANs) that operate in non-volatile memory express over Fabric (NVMe-oF) environments. In various embodiments, this is accomplished by allowing a network entity (e.g., a Centralized Discovery Controller (CDC)) to use a pull registration to exchange discovery information with a storage subsystem (e.g., a storage array), advantageously, without requiring storage subsystem to possess complex functionalities present in existing designs.

20 Claims, 24 Drawing Sheets

Related U.S. Application Data which is a continuation-in-part of application No. 16/898,191, filed on Jun. 10, 2020, now Pat. No. 11,237,997, which is a continuation-in-part of application No. 16/820,547, filed on Mar. 16, 2020, now Pat. No. 11,163,716.

(51) Int. Cl.
| | |
|---|---|
| *H04L 12/46* | (2006.01) |
| *G06F 13/16* | (2006.01) |
| *G06F 13/42* | (2006.01) |
| *H04L 61/4511* | (2022.01) |
| *H04L 67/561* | (2022.01) |
| *G06F 3/06* | (2006.01) |
| *H04L 41/0813* | (2022.01) |
| *H04L 61/4541* | (2022.01) |

(52) U.S. Cl.
CPC .......... *G06F 3/0631* (2013.01); *G06F 3/0653* (2013.01); *G06F 13/1668* (2013.01); *G06F 13/4282* (2013.01); *H04L 12/4641* (2013.01); *H04L 41/0813* (2013.01); *H04L 61/4511* (2022.05); *H04L 67/1063* (2013.01); *H04L 67/561* (2022.05); *H04L 61/4541* (2022.05)

(58) Field of Classification Search
CPC ............. H04L 67/1063; H04L 67/2804; G06F 13/1668; G06F 13/4282; G06F 3/0604; G06F 3/0631; G06F 3/0653; G06F 3/067
See application file for complete search history.

(56) References Cited

U.S. PATENT DOCUMENTS

| | | |
|---|---|---|
| 2019/0245924 A1 | 8/2019 | Li |
| 2020/0065269 A1 | 2/2020 | Balasubramani |
| 2020/0081640 A1 | 3/2020 | Enz |
| 2020/0310657 A1 | 10/2020 | Cayton |
| 2020/0319812 A1 | 10/2020 | He |
| 2020/0349094 A1 | 11/2020 | Smith |
| 2020/0409893 A1 | 12/2020 | Puttagunta |
| 2021/0019272 A1 | 1/2021 | Olarig |
| 2021/0028987 A1 | 1/2021 | Krivenok |
| 2021/0064281 A1 | 3/2021 | Satapathy |
| 2021/0124695 A1 | 4/2021 | Jaiswal |
| 2021/0288878 A1* | 9/2021 | Smith ................. H04L 61/1541 |
| 2021/0289029 A1 | 9/2021 | Smith |

OTHER PUBLICATIONS

Notice of Allowance and Fee(s) Due dated Jul. 9, 2021, in related U.S. Appl. No. 16/898,191. (5pgs).
Notice of Allowance and Fee(s) Due dated Sep. 23, 2021, in related U.S. Appl. No. 16/820,547. (7pgs).
Notice of Allowance and Fee(s) Due dated Apr. 30, 2021, in related U.S. Appl. No. 16/820,547. (5pgs).
Notice of Allowance and Fee(s) Due dated Dec. 8, 2021, in related U.S. Appl. No. 16/925,131. (7pgs).
Non-Final Office Action dated Jun. 11, 2021, in U.S. Appl. No. 16/898,216. (10 pgs).
Non-Final Office Action dated Jun. 11, 2021, in U.S. Appl. No. 16/898,191. (7 pgs).
"FC and FCoE versus iSCSI—"Network-centric" versus "End-Node-centric" provisioning," [online], [Retrieved Oct. 12, 2020]. Retrieved from Internet <URL: https://brasstacksblog.typepad.com/brass-tacks/2012/02/fc-and-fcoe-versus-iscsi-network-centric-versus-end-node-centric-provisioning.html> (6pgs).
"NVMe over Fabrics' Discovery problem," [online], [Retrieved Oct. 12, 2020] Retrieved from Internet <URL: https://brasstacksblog.typepad.com/brass-tacks/2017/12/nvme-over-fabrics-discovery-problem.html> (2pgs).
"Hard zoning versus soft zoning in a FC/FCoE SAN," [online], [Retrieved Oct. 12, 2020] Retrieved from Internet <URL: https://brasstacksblog.typepad.com/brass-tacks/2012/01/hard-zoning-versus-soft-zoning-in-a-fcfcoe-san.html> (5pgs).
"NVM Express Over Fabrics," revision 1.0, May 31, 2016, [online], [Retrieved Oct. 12, 2020] Retrieved from Internet <URL:http://nvmexpress.org> (49pgs).
"NVM Express Over Fabrics," revision 1.1, Oct. 22, 2019, [online], [Retrieved Oct. 12, 2020] Retrieved from Internet <URL:http://nvmexpress.org> (83pgs).
"NVM Express Base Specification," revision 1.4, Jun. 10, 2019, [online], [Retrieved Oct. 12, 2020] Retrieved from Internet <URL:http://nvmexpress.org> (403pgs).
Notice of Allowance and Fee(s) Due dated Jul. 9, 2021, in related U.S. Appl. No. 16/820,547. (7pgs).
Non-Final Office Action dated Jul. 23, 2021, in U.S. Appl. No. 16/925,131. (11 pgs).
"NVM ExpressTM over Fabrics Revision 1.1," [online], [Retrieved May 7, 2021] Retrieved from Internet <URL: https://nvmexpress.org/wp-content/uploads/NVMe-over-Fabrics-1.1-2019.10.22-Ratified.pdf> (83pgs).
Non-Final Office Action dated Mar. 10, 2022, in U.S. Appl. No. 17/200,896. (10 pgs).
Response to Non-Final Office Action, filed Jun. 10, 2022, in U.S. Appl. No. 17/200,896. (11 pgs).
Notice of Allowance and Fee(s) Due dated, Jun. 30, 2022, in U.S. Appl. No. 17/200,896. (8 pgs).

* cited by examiner

*500*

| | OpCode= E1h | FUSE, Reserved, PSDT | CID | |
|---|---|---|---|---|
| 0 | | | | 3 |
| 4 | NSID = 0h | | | 7 |
| 8 | Reserved | | | 15 |
| 16 | MPTR - Not used, Reserved | | | 23 |
| 24 | | | | |
| | DPTR - SGL1 | | | 39 |
| 40 | CDW10 — 505 | | | 43 |
| 44 | 510 — CDW11 | | | 47 |
| 48 | CDW12 - Reserved | | | 51 |
| 52 | CDW13 - Reserved | | | 55 |
| 56 | CDW14 - Reserved | | | 59 |
| 60 | CDW15 - Reserved | | | 63 |

FIG. 5

KICKSTART DISCOVERY CONTROLLER CONNECTION COMMAND

CROSS-REFERENCE TO RELATED APPLICATIONS

This patent application is a continuation-in-part of and claims priority benefit under 35 USC § 120 to co-pending and commonly-owned U.S. patent application Ser. No. 16/898,216, filed on 10 Jun. 2020, entitled "IMPLICIT DISCOVERY CONTROLLER REGISTRATION OF NON-VOLATILE MEMORY EXPRESS (NVMe) ELEMENTS IN AN NVMe-OVER-FABRICS (NVMe-OF)," and listing Erik Smith, Joseph White, David Black, and Raja Subbiah as inventors (Docket No. DC-118181.01 (20110-2377)), which patent application is a continuation-in-part of and claims priority benefit under 35 USC § 120 to co-pending and commonly-owned U.S. patent application Ser. No. 16/898,191, filed on 10 Jun. 2020, entitled "TARGET DRIVEN ZONING FOR ETHERNET IN NON-VOLATILE MEMORY EXPRESS OVER-FABRICS (NVMe-OF) ENVIRONMENTS," and listing Erik Smith, Joseph White, David Black, and Raja Subbiah as inventors (Docket No. DC-118182.01 (20110-2378)), which patent application:

(1) is a continuation-in-part of and claims priority benefit under 35 USC § 120 to co-pending and commonly-owned U.S. patent application Ser. No. 16/820,547, filed on 16 Mar. 2020, entitled "DISCOVERY CONTROLLER REGISTRATION OF NON-VOLATILE MEMORY EXPRESS (NVMe) ELEMENTS IN AN NVMe-OVER-FABRICS (NVMe-oF) SYSTEM," and listing Erik Smith, Joseph White, David Black, and Raja Subbiah as inventors (Docket No. DC-118180.01 (20110-2376)); and (2) claims priority to and the benefit of under 35 USC § 119 the provisional patent application entitled "TARGET DRIVEN ZONING FOR ETHERNET IN NON-VOLATILE MEMORY EXPRESS OVER-FABRICS (NVMe-OF) ENVIRONMENTS," Indian Patent Application Number 202011017755, filed in the Indian Patent Office on 25 Apr. 2020.

Each patent document is incorporated by reference herein in its entirety and for all purposes.

BACKGROUND

A. Technical Field

The present disclosure relates generally to information handling systems. More particularly, the present disclosure relates to registration systems and methods for communication networks that operate in non-volatile memory express over Fabric (NVMe-oF) environments.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Enterprise customers are under tremendous pressure to reduce the expense for data storage. To this end, as the customers review their infrastructures and look for opportunities to eliminate costs, some have come to view the Fibre Channel Storage Area Network (FC SAN) as an unnecessary expense. That is, at least until they realize that any savings they would achieve through a capital expenditure reduction (e.g., by moving off of FC and onto NVMe-oF (TCP)) may be more than paid back in operational expense due to the end-node centric nature of Ethernet-based transports.

In addition, until recently, the performance attributes of storage traffic over Ethernet were significantly worse than FC's. For example, CPU utilization and latency were typically much higher; input-output-per-second (IOPs)/bandwidth were typically significantly lower. However, upon introduction of a new storage networking protocol "NVMe" and its use of RoCE (Remote Direct Memory Access (RDMA) over Converged Ethernet), all of this has changed and NVMe over 25G RoCE has equivalent CPU utilization, input-output operations per second (IOPS) and latency as SCSI-FCP over 32 Gigabits Fiber Channel (GFC).

FC is considered by some to be the most popular transport protocols because: (1) it provides a relatively complete set of supported devices and data services; and (2) the customers of FC have spent the past twenty years developing business processes and deployment best practices around FC and its network-centric approach to provisioning.

A basic problem of an Ethernet transport for NVMe-oF, such as transmission control protocol (TCP) or remote-direct-memory-access (RDMA) over converged-Ethernet (RoCE), is that the underlying Ethernet transport is an end-node centric storage protocol (i.e., every NVMe host must be explicitly configured to access storage at one or more IP addresses). This configuration process is tedious and error prone as well as needing manual intervention in the case of a temporary loss of connectivity (e.g., storage-side cable pull). The current management process of an NVMe-oF-over-Ethernet transport also requires configuration of the multipathing software. Accordingly, it is desirable to provide solutions that resolve the end-node device configuration problems, including access control, of NVMe-oF-over-Ethernet transports.

In existing NVMe-oF systems, discovery of an NVM subsystem interface typically requires a host acquiring the destination IP addresses of to-be-connected subsystem interfaces. This involves registering the subsystem's IP addresses with a Centralized Discovery Controller (CDC) and then communicating these addresses to a host. However, less sophisticated NVMe-oF subsystem implementations lack the ability to explicitly register with the CDC, which is usually a task reserved for NVMe hosts. Therefore, many NVMe-oF subsystems are unable to perform registration to enable the desired discovery.

Accordingly, it is highly desirable to find new and more efficient discovery and registration techniques in communication networks such as NVMe-oF systems.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 5 depicts a discovery controller registration command, according to embodiments of the present disclosure.

DETAILED DESCRIPTION OF EMBODIMENTS

Figure 1:
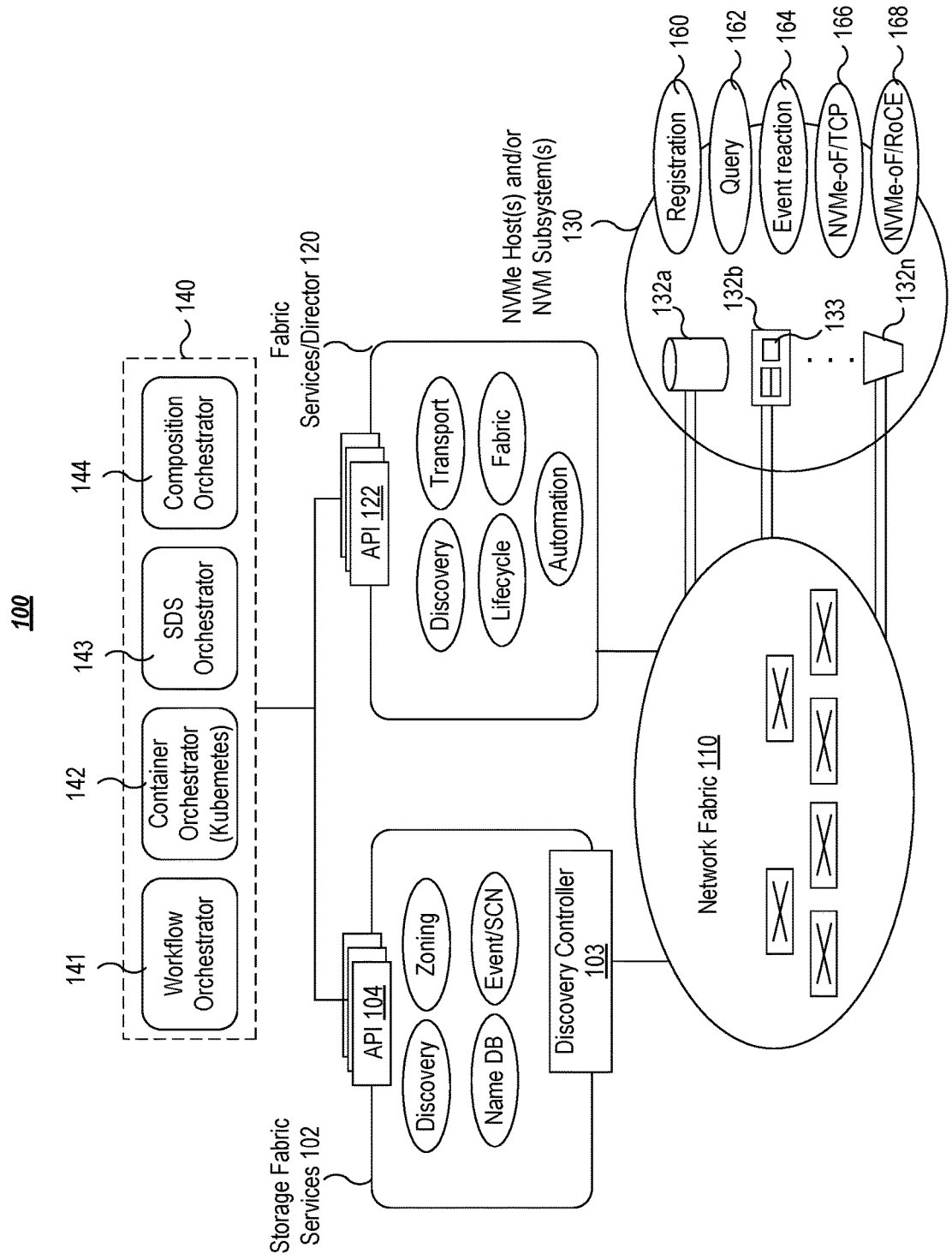
FIG. 1 depicts a Non-Volatile Memory express over Fabric (NVMe-oF) ecosystem, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment,"

"embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

In this document, the terms "discovery controller," "centralized discovery controller," and "discovery controller proxy" may be used interchangeably. Each reference/document mentioned herein is incorporated by reference herein in its entirety.

A. GENERAL INTRODUCTION

Embodiments herein address limitations of prior approaches by providing a set of storage fabric services, which may be embodied in or implemented using a Storage Fabric Services (StFS) component, that can be used to support discovery of end device information and supported protocols. In one or more embodiments, a StFS leverage and extend existing networking services, such as SmartFabric Services (SFS) to provide such features, which is described in commonly-owned U.S. patent application Ser. No. 16/263,791, filed on 31 Jan. 2019, entitled "SWITCHING FABRIC CONFIGURATION AND MANAGEMENT SYSTEM," and listing Joseph White, Balaji Rajagopalan, Pawan Singal, Charles Park, and Saleem Muhammad as inventors (Docket No. DC-113010.01), which patent document is incorporated by reference herein in its entirety.

As provided in more detail below, embodiments add several ecosystem level innovations, including but not limited to: (1) an NVMe Discovery Controller, which may reside, for example, on a switch or in a VM attached to the storage fabric, that acts as a centralized discovery service and support; (2) ability of NVMe hosts and NVM subsystems to discover the centralized discovery service automatically; (3) ability of NVMe hosts and NVM subsystems to centrally register transport information and registration of access control-related information; (4) one or more NVMe host-based services that facilitates: (a) registration of host transport-specific information with a centralized discovery service; (b) querying the centralized discovery service to discover the transport-specific information associated with one or more NVM subsystems it has been granted access to; (c) modifying one or more hosts' NVMe-over-Fabrics connectivity information and establishing connectivity to one or more available NVM subsystems using the best protocol supported by both end devices; (d) updating host NVMe multipathing information; and (e) listening for asynchronous events and performing one or more connectivity remediation actions based upon those events; and (5) one or more NVM subsystem-based services that facilitates: (a) registering NVM subsystem transport-specific information with a centralized discovery service; (b) querying the centralized discovery service to discover the transport-specific information associated with one or more NVMe hosts that may potentially be allowed to access namespaces on that array; (c) modifying the namespace access control mechanism of an NVM subsystem to allow one or more NVMe hosts to access specific namespaces; (d) publishing a list of the NVMe hosts that have been granted access to a particular NVM subsystem interface to the discovery controller; and (e) listening for asynchronous events and performing one or more connectivity remediation actions based upon those events.

In one or more embodiments, these features provide a FC-like end-user experience.

B. EXPLICIT REGISTRATION EMBODIMENTS

FIG. 1 depicts an NVMe-over-Fabrics (NVMe-oF) system 100, according to embodiments of the present disclosure. As depicted, the system 100 may include: a Storage Fabric Service (StFS) 102, which includes (among other features or services) a discovery controller 103 (which may also be referred to as an NVMe discovery controller, a centralized discovery controller, or a root discovery controller) that provides access to the discovery services for NVMe hosts (e.g., 132b) and NVM storage subsystems (e.g., 132a and 132n); a network fabric 110 that may include one or more switches and routers; a fabric service/director 120 (such as, SmartFabric Service/Director by Dell of Round Rock, Tex.—although embodiments herein reference SmartFabric Service/Director, it shall be noted that other fabric services/directors may be used); and one or more orchestrators 140.

In one or more embodiments, the NVMe entities 130 may include one or more hosts (e.g., host 132b), one or more storage elements (e.g., storage items 132a and 132n), or both. As depicted in FIG. 1, these devices are communicatively coupled to the network fabric 110. A host may be an NVMe server or any other suitable type of computing device that is capable of accessing data stored in a storage element (e.g., one or more of the storage elements 132a and 132n) via the network fabric 110. A storage element (e.g., storage element 132a and/or 132n) may be an NVM subsystem (the terms storage element and NVM subsystem may be used interchangeably herein), which may be implemented as a storage array, multiple NVMe-oF drives, storage volume, namespace, logical unit number (LUN), extent, disk, or the like. It is noted that the system 100 may include any number of NVMe hosts and/or NVM subsystems 130.

In one or more embodiments, the StFS 102 may reside on a computing device or devices of the network fabric 110, including on one or more virtual machines operating within or attached to the network fabric 110; however, it shall be noted that the StFS 102 may reside within any other suitable components in the system 100. In one or more embodiments, the StFS 102 may include one or more Application Programming Interfaces (APIs) 104 and be communicatively coupled to one or more orchestrators 140, in which the orchestrators 140 may include (but are not limited to) workflow orchestrator 141, container orchestrator 142, Software Defined Storage (SDS) orchestrator 143, and composition orchestrator 144. In one or more embodiments, these orchestrators are management & orchestration software systems, such as (by way of example and not limitation) Kubernetes, VMware's vROPS (vRealize Operations).

In one or more embodiments, one or more of the orchestrators 141-144 are instantiated as services that run within a container, as part of a virtual machine (VM), or as a stand-alone service or application running on a bare metal server platform. In one or more embodiments, the workflow orchestrator (e.g., vRealize Operations (vROps), StackStorm, and Ansible Tower) is responsible for coordinating the discrete steps that are performed as a part of automating a given system configuration process. In one or more embodiments, the workflow orchestrator performs a configuration step, checks that the step completed successfully, and then performs the next configuration step (which may involve using information retrieved from the system after a prior configuration step or steps). A workflow orchestrator may also support a rewind function in case one or more of the steps fail.

In one or more embodiments, the container orchestrator (e.g., Kubernetes) is responsible for managing the lifecycle of any containers, which may include managing connections to persistent storage (e.g., Container Storage Interface (CSI)).

In one or more embodiments, the SDS orchestrator handles configuration of as well as overall monitoring of system resources used to create storage volumes from server resident storage capacity.

In one or more embodiments, the composition orchestrator uses the inventory of discrete system resources (e.g., CPU, memory, GPU, Smart NICs) to create composable hardware (HW) appliances. These composable HW appliances may be created from components that reside in either the same server chassis or from physically separate server chassis (e.g., CPU from system A, memory from system B, GPU from system C, etc.).

In one or more embodiments, the fabric service/director 120 may include one or more APIs 122 and may be communicatively coupled to the StFS 102, orchestrators 140, and the network fabric 110. In one or more embodiments, the fabric service/director 120 may be a controller that automatically configures a cluster of switches in the network fabric 110. In one or more embodiments, the fabric service/director 120 may perform various functions, such as discovery, transport, lifecycle, fabric and automation.

Figure 2:
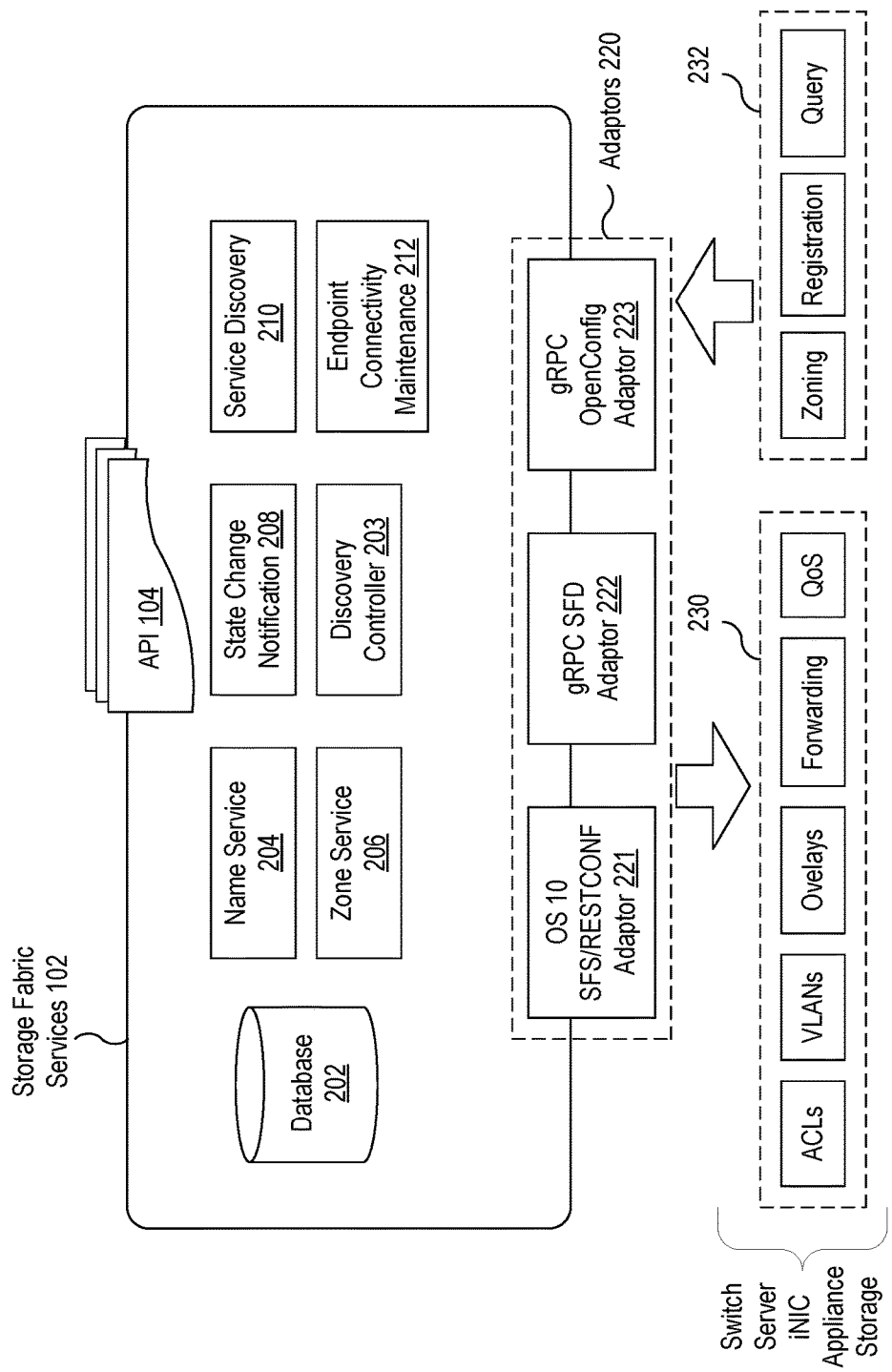
FIG. 2 depicts a Storage Fabric service (StFS), according to embodiments of the present disclosure.

FIG. 2 graphically depicts an StFS 102, according to embodiments of the present disclosure. As depicted, the StFS 102 may include: a data store 202 (such as name database, name DB, in FIG. 1) for storing data, which may include storing and retrieving registration data; the APIs 104, including APIs for interfacing with one or more of the north-bound elements 140; and one or more adaptors 220 for communicating data with or to various network components, such as switch, server, Smart Network Interface Controller (Smart NIC), Network Interface Controller (NIC), appliance and storage. As shown in FIG. 1, in one or more embodiments, the StFS 102 may perform various functions: discovery of NVMe transport specific information, storing/retrieving registration information in/from the name database, and generating asynchronous events (e.g., Asynchronous Event Notifications (AEN)). In one or more embodiments, zoning may be supported in which the scope of discovery for a device may be limited, and zoning can act as a coarse grained (e.g., network interface level) access control mechanism and/or load balancing.

In one or more embodiments, the adaptors 220 communicate with network devices (e.g., switches and other fabrics devices). In one or more embodiments, the adaptors may include, but are not limited to, OS 10 SmartFabric Services (SFS)/REST adaptor 221, gRPC SmartFabric Director adaptor 222, and gRPC open configuration (OpenConfig) adaptor 223. In one or more embodiments, the adaptors 220 may send data 230, such as Access Control List (ACLs), virtual Local Area Networks (VLANs), Overlays, Forwarding, and Quality of Service (QoS). In one or more embodiments, the adaptors 220 may receive data 232, such as zoning information, registration (which discussed herein), and query data.

In one or more embodiments, the StFS 102 may perform various functions including but not limited to: name service 204 for storing and retrieving registration data in/from the database (or data store) 202; zone service 206, which were as discussed above; asynchronous events (e.g., Asynchronous Event Notifications (AEN) or State Change Notification (SCN)) 208 for notifying a change in status of an NVMe entity (i.e., an NVMe host or an NVM subsystem) or any of its elements (an element of an NVMe entity may refer to an entire device or component (e.g., such as an NVMe host or an NVM subsystem) or may refer to a subset or subcomponent (e.g., an interface, a port, an agent, or a controller of an NVMe host or an NVM subsystem); service discovery 210 for discovering an NVMe-oF communication endpoint for TCP/IP or UDP/IP (which may include: an Internet Protocol (IP) address, a TCP or User Datagram Protocol (UDP) port (and indication of which protocol is used with the port), or an NVMe-oF transport protocol (e.g., TCP, RoCEv2, or RDMA)); and endpoint connectivity maintenance 212 for maintaining connectivity to elements of an NVMe entity.

It shall be noted that the StFS may provide a number of beneficial services. First, in one or more embodiments, concerning an EBOF (Ethernet-attached Bunch of Flash products) configuration server, the StFS may provide a configuration repository for the EBOF products, which may be an NVMe drive enclosure containing multiple NVMe drives that can be connected to via Ethernet. In one or more embodiments, when an EBOF product comes online, it pulls its NVMe layer configuration (e.g., name space masking/mapping to hosts) from the configuration repository. This avoids the need for more complicated EBOF hardware, as well as decreases the need for users to interact with an embedded management application reside on the EBOF product.

Second, in one or more embodiments, concerning StFS Traffic Engineering Service, a StFS can consume telemetry information from NVMe hosts, NVM subsystems, and the fabric to detect hot spots (e.g., trouble areas, high traffic areas, down elements, etc.), drops and in the case of RoCE, congestion spreading, etc. It should be noted that references to RoCE herein are referring to RoCEv2 or other implementations or protocols with the same or similar functionality. A traffic Engineering Service may use this information to generate Explicit Congestion Notification packets to reduce the impact of these events in real time, as well as generate bandwidth/IO limits to prevent recurrence.

Third, in one or more embodiments, StFS can serve as a zoning attributes repository. Zoning functionality enables two or more NVMe entities to communicate with one another, and zoning attributes may be used to define how the devices communicate with each other. This information may be read by any of the elements participating (e.g., host, storage, switch in the fabric, etc.) to allow each to self-configure based on the attributes. For example:

a. Quality of Service (QoS)—QoS attributes specify performance aspects of communication among NVMe entities. In one or more embodiments, these attributes may include, but are not limited to, minimum and maximum values for bandwidth and latency. These values may be used by the Fabric to ensure that the flow uses the appropriate route, or by the storage to ensure that the appropriate class of storage media is used, or by the host to allow it to check whether the response time that it is experiencing is expected.

b. Transport depending on the requirements of the application, a specific transport (e.g., RoCE, TCP) may be desired. It should be noted that transport is an NVMe-oF communication endpoint characteristic, and typically all the endpoints in a zone use the same transport.

c. Isolation it may be desirable in some cases to specify that a particular set of NVMe-oF end devices should be isolated to their own VLAN or Virtual Network Instance.

Fourth, in one or more embodiments, StFS can provide an embedded key management service for authentication and end-to-end encryption keys.

Figure 3:
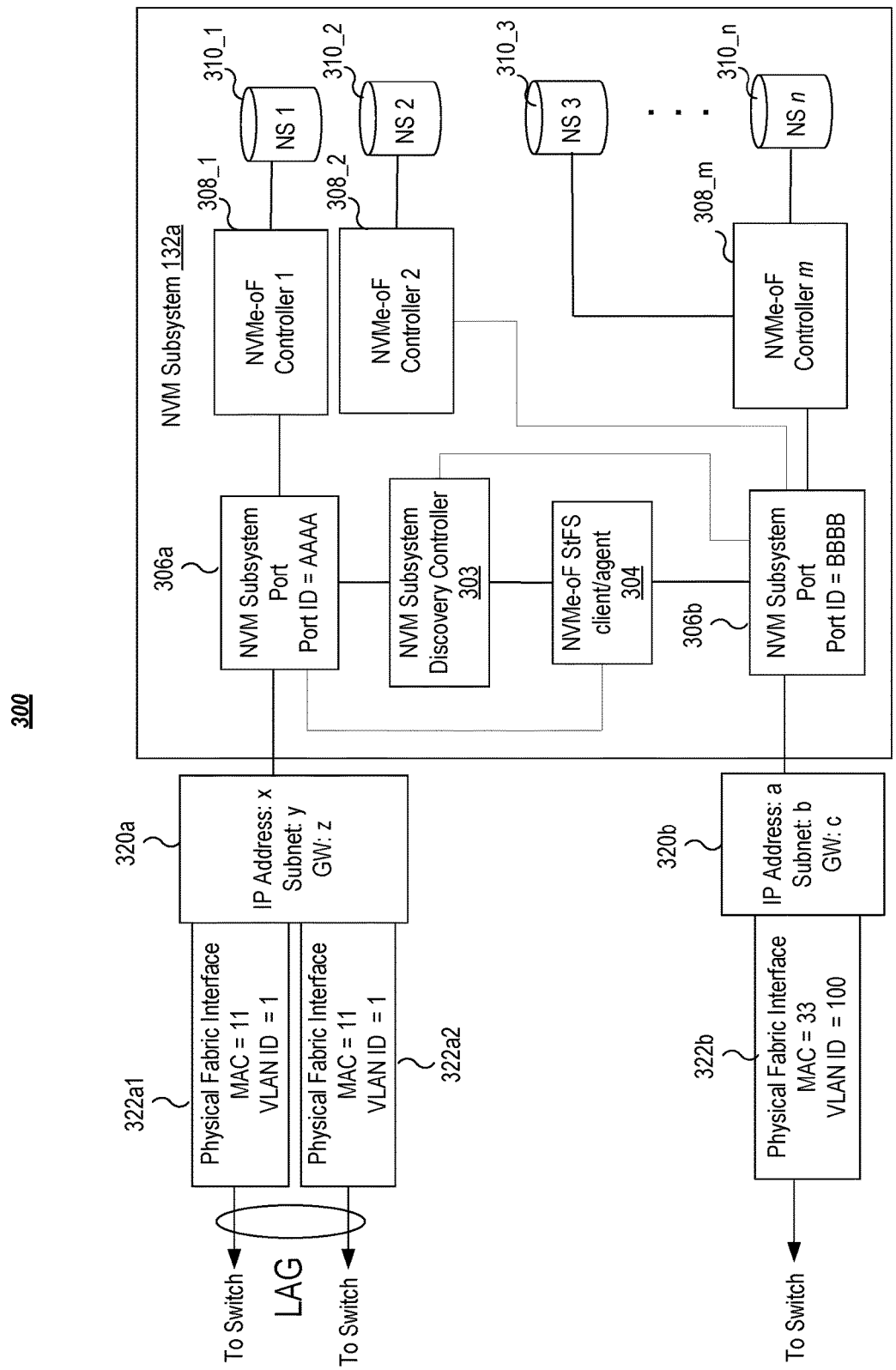
FIG. 3 depicts an NVM subsystem, according to embodiments of the present disclosure.

FIG. 3 depicts an NVM subsystem 132a, according to embodiments of the present disclosure. It shall be noted that the depicted NVM subsystem is an example provided to help facilitate the disclosure and that other NVM subsystem configurations may also be used. As depicted, the NVM subsystem 132a may include: one or more storage volumes 310_1-310_n; one or more NVMe-oF controllers 308_1-308_m that are communicatively coupled to and control data flow to/from the storage volumes 310_1-310_n; one or more NVM subsystem ports 306a and 306b through which the NVMe-oF controllers 308_1-308_m communicate data via the network fabric 110; an NVMe-oF discovery controller 303 communicatively coupled to the NVM subsystem port 306a and 306b; and NVMe-oF StFS client (which may also be referred to herein as an StFS agent) 304. While not illustrated in FIG. 3, it shall be noted that the NVM subsystem may comprise more connections between the NVMe-oF controllers 308_1-308_m and the storage volumes. For example, there may be m×n connectivity between the NVMe-oF controllers 308_1-308_m and the storage volumes 310_1-310_n. As illustrated in FIG. 3, the NVM subsystem ports (e.g., ports 306a and 306b) may be communicatively coupled to physical fabric interfaces (e.g., interfaces 322a1-322a2 and 322b), which are or provide communicative coupling to the network fabric 110.

In one or more embodiments, the NVM subsystem controllers 308_1-308_m provides access to the storage volumes 310_3-310_n, which may be realized as one or more NVMe namespaces. In one or more embodiments, namespaces are attached to controllers and/or controllers provide access to attached namespace. While not illustrated in FIG. 3, it shall be noted that the NVM subsystem 132a may comprise a set of NVMe-oF controllers 308_x per port. In one or more embodiments, each NVM subsystem port may have associated with it a port identifier (portID), an IP address, a subnet address, a gateway address, and a Media Access Control (MAC) address. Also, in one or more embodiments, a physical fabric interface may have a VLAN ID. In one or more embodiments, when dealing with trunked interface in which a physical port is on multiple VLANs, an implementation may comprise an StFS instance per relevant VLAN. In one or more embodiments, the NVMe hosts and NVM subsystems 130 may use Ethernet-based transports, such as, but not limited to, NVMe-oF/TCP 166 or NVMe-oF/RoCE 168. In one or more embodiments, to resolve problems associated with the conventional NVMe-over-Ethernet transports, each NVMe entity may include an StFS client/agent (such as agent/client 133 and 304) that communicates to the StFS 102 so as to perform registration of data associated with an NVMe host or NVM subsystem element or elements with the StFS 102. In one or more embodiments, the data associated with an element of an NVMe host or NVM subsystem may include one or more of the following: attribute(s), setting(s), characteristic(s), property/properties. For example, this data may include transport interface information that relates to access control of an element. As used herein, an element may refer to an entire device or component (e.g., such as an NVMe host or an NVM subsystem) or may refer to a subset or subcomponent (e.g., an interface, a port, an agent, or a controller of an NVMe host or an NVM subsystem). In one or more embodiments, this data is provided by the StFS agent (133 and 304) to the StFS to be stored in the data store 202.

In one or more embodiments, upon receipt of a query from an NVMe host or NVM subsystem (e.g., from an StFS agent of an NVMe host or NVM subsystem), the StFS 102 may provide the transport information stored in the data store 202 for the NVMe host or the NVM subsystem so that the NVMe host or the NVM subsystem is able to discover IP addresses (e.g., 320b) and supported protocols of elements of other NVMe hosts or NVM subsystems that it can access. In one or more embodiments, the StFS 102 may operate as a centralized discovery service so that each NVMe host or NVM subsystem may discover a list of other elements of NVMe hosts or NVM subsystems for which connections can be established to enable data transfers via the network fabric 110.

In one or more embodiments, the StFS 102 may publish its existence to NVMe hosts and NVM subsystems (e.g., items 130) in a system, thereby enabling the NVMe hosts and NVM subsystems to register their transport information with the StFS 102. In one or more embodiments, the NVMe hosts and NVM subsystems may automatically discover the existence of the StFS 102 via service discovery records, such as Domain Name Service-Service Discovery (DNS-SD) records, which may in turn may be retrieved by suing a multicast Domain Name System (mDNS) protocol or another DNS protocol.

In one or more embodiments, when either NVMe-oF over TCP or NVMe-oF over another IP-based protocol (e.g., RoCE, iWARP, etc.) is used in the system 100, before a NVMe host can discover the storage resources (or, namespaces) that have been allocated to the host in the NVM subsystems, the host may first discover the accessible NVM subsystem transport interfaces (e.g., 320a and 320b) behind which the namespaces have been provided. In contrast to conventional systems that do not specify initial discovery, in one or more embodiments, the agent (e.g., agent 133) of the host may send a query to the transport information that is stored in the data store 202 to the StFS 102, and, using the transport information received from the StFS 102, the host may be able to discover all of the NVM subsystems (or transport interfaces) that the host is allowed to access, reducing the usage of system resources to discover the accessible storages resources.

Figure 4:
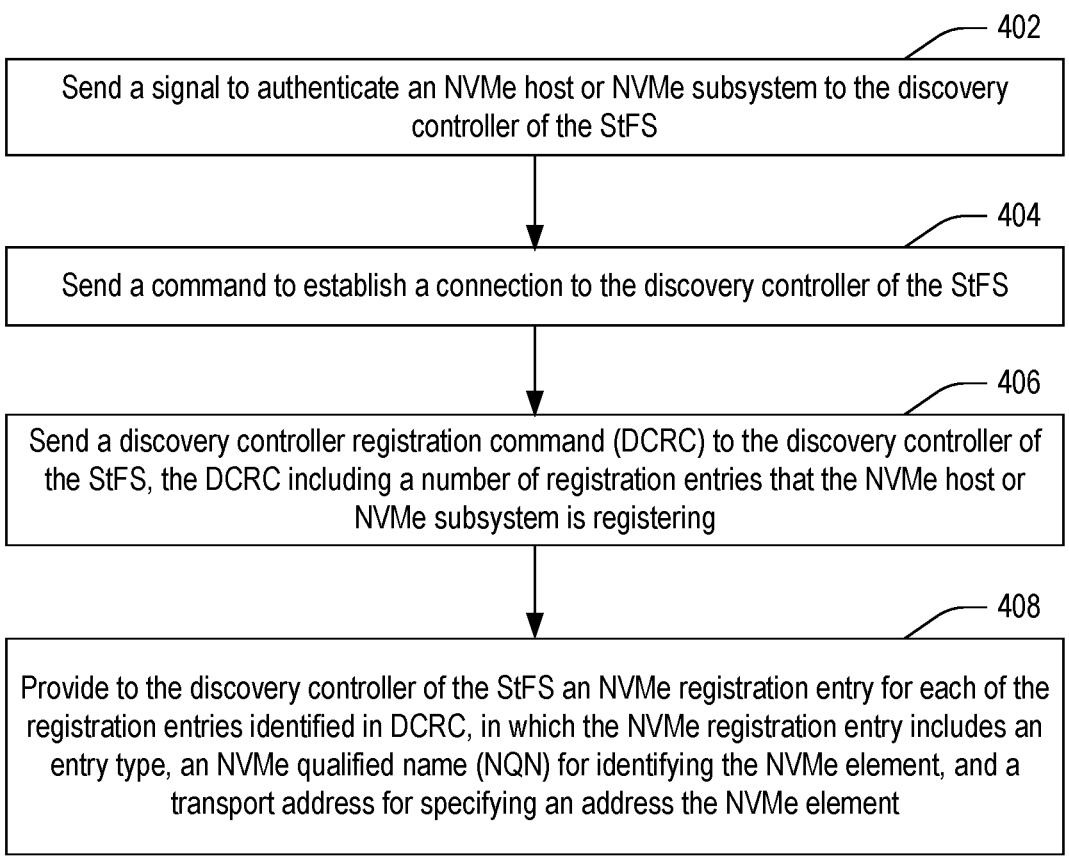
FIG. 4 depicts a flowchart of an exemplary method for registering an NVMe element of an NVMe host or NVM subsystem via a discovery controller of an StFS, according to embodiments of the present disclosure.

In one or more embodiments, before an NVMe host or NVM subsystem sends a query for transport information to the StFS 102, the NVMe host or NVM subsystem registers its transport information with the StFS 102. FIG. 4 depicts a flowchart 400 of an exemplary method for registering the transport information of one or more elements of an NVMe host or NVM subsystem with the StFS 102, according to embodiments of the present disclosure.

As depicted in the embodiment in FIG. 4, the NVMe host or NVM subsystem sends a command (e.g., a Fabric Connect command) (402) to establish a communication connection to the StFS 102. In one or more embodiments, authentication may be required before actual discovery is performed. In one or more embodiments, an NVMe entity (e.g., an NVMe host or NVM subsystem) may send (404) a security signal (which may be for authentication, authorization or both) to a centralized storage fabric service (e.g., the StFS) via the discovery controller 103. A signal may be used to authenticate the NVMe host or NVM subsystem to the centralized storage fabric service. Upon proper authentication, privileges may be authorized; such as, for example, permission to register discovery information or access to a namespace. In one or more embodiments, an StFS agent (e.g., 133 or 304) of the NVMe host or NVM subsystem may perform this function. In one or more embodiments, the command may include sending a Fabric Connect command, which includes an indicator identifying whether the sender is a host or a subsystem. The indicator may be implemented as a CATTR (Connect Attributes) bit or bits, in which one indicator (e.g., 0b) indicates that the connection is being initiated by a NVMe host and another indicator (e.g., 1b) indicates that the connection is being initiated by an NVM subsystem. In one or more embodiments, if the indicator is that of an NVMe host, data may be communicated indicating additional information, such as a host identifier (host ID) and an NVMe Qualified Name (NQN), which is used to uniquely designate an NVMe host or NVM subsystem for various purposes such as identification and authentication; and if the indicator is that of an NVM subsystem, data may be communicated indicating additional information, such as a subsystem NQN (SUB NQN). In one or more embodiments, the system may include a command specific status code that is defined to acknowledge successful processing of the indicator (e.g., the CATTR bit(s)).

Figure 7:
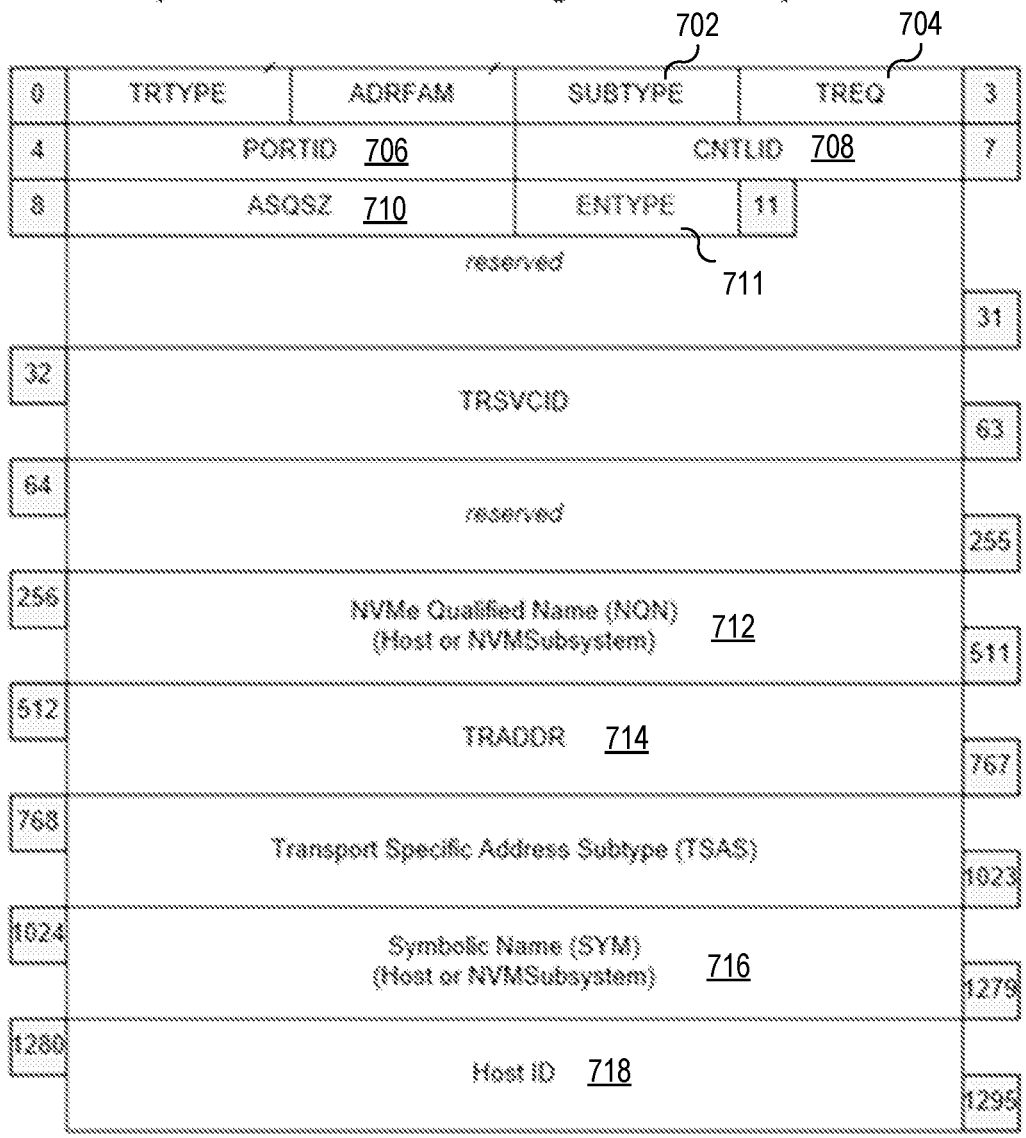
FIG. 7 depicts an NVMe-oF registration entry in FIG. 6 according to embodiments of the present disclosure.

Returning to FIG. 4, the StFS agent may send (406) a discovery controller registration command (DCRC) to the discovery controller 103 of the StFS, wherein the DCRC includes a number of registration entries that the NVMe host or NVM subsystem is registering. In one or more embodiments, the discovery controller of the StFS is provided (408) with a number of NVMe registration entries corresponding to the number in the DCRC. In one or more embodiments, an NVMe registration entry includes an entry type, an NVMe qualified name (NQN) for identifying the NVMe element, and a transport address for specifying an address for the NVMe element. An example of an NVMe registration entry is depicted in FIG. 7, below.

FIG. 5 depicts an example discovery controller registration command (DCRC) 500, according to embodiments of the present disclosure. As depicted in FIG. 5, a discovery controller registration command may include a number of fields, including fields CDW10 505 and CDW11 510. In one or more embodiments, command 505 includes record format information, which specifies the format of the discovery controller registration command, and command 510, which specifies the number of discovery controller registration entries that are being provided by the NVMe host or NVM subsystem to be registered with the discovery controller/StFS. It shall be noted that other fields may be present (e.g., Opcode (identifies the command to be executed by the discovery controller), NameSpace Identifier (NSID) (identifies the namespace or storage volume involved), Command Identifier (CID) (specifying a unique identifier for the command), Data Pointer (DPTR) (contains a Scatter-Gather List (SGL) Entry (alternatively, an SGL list that comprises one SGL entry) that tells the Fabric/Transport how to transfer the data for the command, e.g., the registration entries), among other possible field). In one or more embodiments, the discovery controller registration command may be of the form of an Admin command, such as described in the NVM Express™ Base Specification Rev. 1.4 (which is incorporated herein by reference in its entirety), which is produced by the NVM Express organization-a non-profit consortium of technology industry leaders. It shall be noted that other types and formats of command may be employed.

As noted above, at step 406, there is an identifier (e.g., indicator 510) that indicate the number of discovery controller registration entries that are being provided by the NVMe host or NVM subsystem. In one or more embodiments, the NVMe host or NVM subsystem has corresponding discovery controller registration data comprising an NVMe registration entry for the corresponding number of elements. In one or more embodiments, each NVMe registration entry may correspond to a single physical interface that has an IP address. By way of example and not limitation, assume NVM subsystem 132a has two elements it seeks to register (e.g., the two NVM subsystem ports 306a and 306b, which are respectively associated with IP addresses 320a and 320b). In this example, the identifier (e.g., indicator 510) will be set to the value "2."

In one or more embodiments, an NVM subsystem may include one or more NVMe-oF discovery controllers (e.g., discovery controller 303, as shown in FIG. 3). When a host queries the transport information of the NVM subsystem, the NVMe-oF discovery controller may provide the transport information of the NVM subsystem ports or subsystem controllers. However, in one or more embodiments, the NVM subsystem controllers (e.g., NVM subsystem controllers 308_1-308_m) cannot register their transport information with the NVMe-oF discovery controller. Instead, as discussed above, the StFS agent (e.g., StFS agent 304) may register the transport information of the NVM subsystem controllers (e.g., NVM subsystem controllers 308_1-308_m) and/or the NVM subsystem discovery controller (e.g., NVM subsystem discovery controller 303) with the StFS.

Upon receiving the discovery controller registration data 600 from the NVMe host or NVM subsystem, the StFS 102 stores the received information (e.g., stores the information in data store 202). Given the stored discovery controller registration data, the StFS 102 may function as a central discovery controller of a system (e.g., system 100).

Figure 6:
FIG. 6 depicts discovery controller registration data, according to embodiments of the present disclosure.

FIG. 6 depicts a discovery controller registration data format 600, according to embodiments of the present disclosure. As depicted, the discovery controller registration data format 600 includes one or more data blocks 602A-602n, where each data block includes data for an NVMe registration entry and the number n relates to the identifier (e.g., indicator 510) in the discovery controller registration command (DCRC). For example, if the number of entries identified in the discovery controller registration command is m then there will be 0 through n entries 602, in which n=m−1.

FIG. 7 depicts an embodiment of an NVMe registration entry (e.g., 602x in FIG. 6), according to embodiments of the present disclosure, which may be registered with a discovery controller/StFS. It shall be noted that the NVMe registration entry embodiment in FIG. 7 is only one example and that different configurations/layout, different fields (or parameters), and different data field sizes may be used. It shall also be noted that the data format of the discovery controller registration data 600 may be used by a host or a subsystem. In one or more embodiments, the NVMe registration entry 700 may include such parameters as:

(1) Transport Type (TRTYPE), which specifies the NVMe Transport type;

(2) Subsystem Type (SUBTYPE), which may include an indicator of the type of the NVM subsystem (e.g., a Discovery subsystem or an NVM subsystem) or whether it is an NVM subsystem at all;

(3) Transport Requirements (TREQ), which may be used to indicate whether authentication is required and may distinguish transport requirements between an NVMe host and an NVM subsystem;

(4) Entity Type (ENTYPE), which may indicate the type of NVMe entity (e.g., a first value may indicate that the NVMe entity is not specified; a second value may indicate that the NVMe entity is an NVM subsystem; and a third value may indicate that the NVMe entity is an NVMe Host;

(5) NVM Qualified Name, which indicates: (a) for NVM subsystems, the NVM Subsystem Qualified Name (SUB-NQN) that uniquely identifies the NVM subsystem, and (b) for NVMe hosts, the NVMe Qualified Name (NQN) that uniquely identifies the host system;

(6) Transport Address (TRADDR), which indicates: (a) for NVM subsystems, the address of the NVM subsystem port that may be used for a connect command, and (b) for NVMe hosts, the address of the host interface that will be used to connect to NVM subsystem or to a controller on the NVM subsystem;

(7) Transport Specific Address Subtype (TSAS), which specifies additional information about the transport address of item (6) (above);

(8) Symbolic Name (SYM), which specifies a Symbolic Name of the NVMe host or NVM subsystem (which may be specified as an ASCII or Unicode string). In one or more embodiments, an Address Family field describes the reference for parsing this field; and (9) Host Identifier (HOSTID), which is used for NVMe hosts and may have the same definition as the Host Identifier defined in the "Host Identifier" section of the NVMe Base specification, which is incorporated by reference herein.

Figure 8:
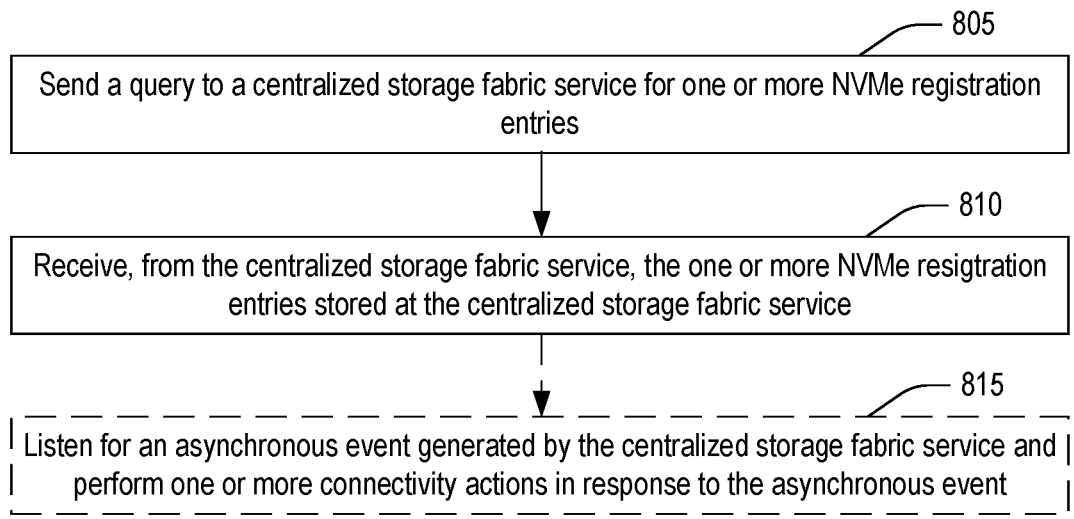
FIG. 8 depicts a method in which an NVMe host or an NVM subsystem may obtain information that has been registered with a centralized Storage Fabric service (StFS), according to embodiments of the present disclosure.

FIG. 8 depicts a method in which an NVMe host or an NVM subsystem may obtain information that has been registered with a centralized storage fabric service, according to embodiments of the present disclosure. In one or more embodiments, an NVMe host or NVM subsystem may send (805) a query to a centralized storage fabric service (e.g., StFS 102) to discover zero or more NVMe registration entries (such as, transport specific information) associated with an NVMe element. In one or more embodiment, the NVMe host or NVM subsystem may receive one or more NVMe registration entries from the centralized storage fabric service in response to the query. For instance, the host 132b (or the StFS agent 133) may send the query 162 to the StFS 102 to discover NVMe registration entries (such as transport specific information) associated with the NVM subsystems that the host 132b has been granted access to. Upon receiving the query from the host 132b, the StFS 102 may retrieve and return (810) the NVMe registration entry stored in the data store 202. In another example, the StFS agent 304 may send a query to the StFS 102 to discover a NVMe registration entry associated with the NVMe hosts that may potentially be allowed to access one or more namespaces associated with the NVM subsystem 300. Upon receiving the query, the StFS 102 retrieve and returns (810) the relevant NVMe registration entry or entries stored in its data store.

In one or more embodiments, the StFS may perform other functions. For instance, in one or more embodiments, a controller that is part of either an NVMe host or an NVM subsystem may listen for an Asynchronous Event Notification (AEN) generated by the StFS and perform one or more connectivity actions, one or more discovery actions, or both in response to the asynchronous event.

Figure 9:
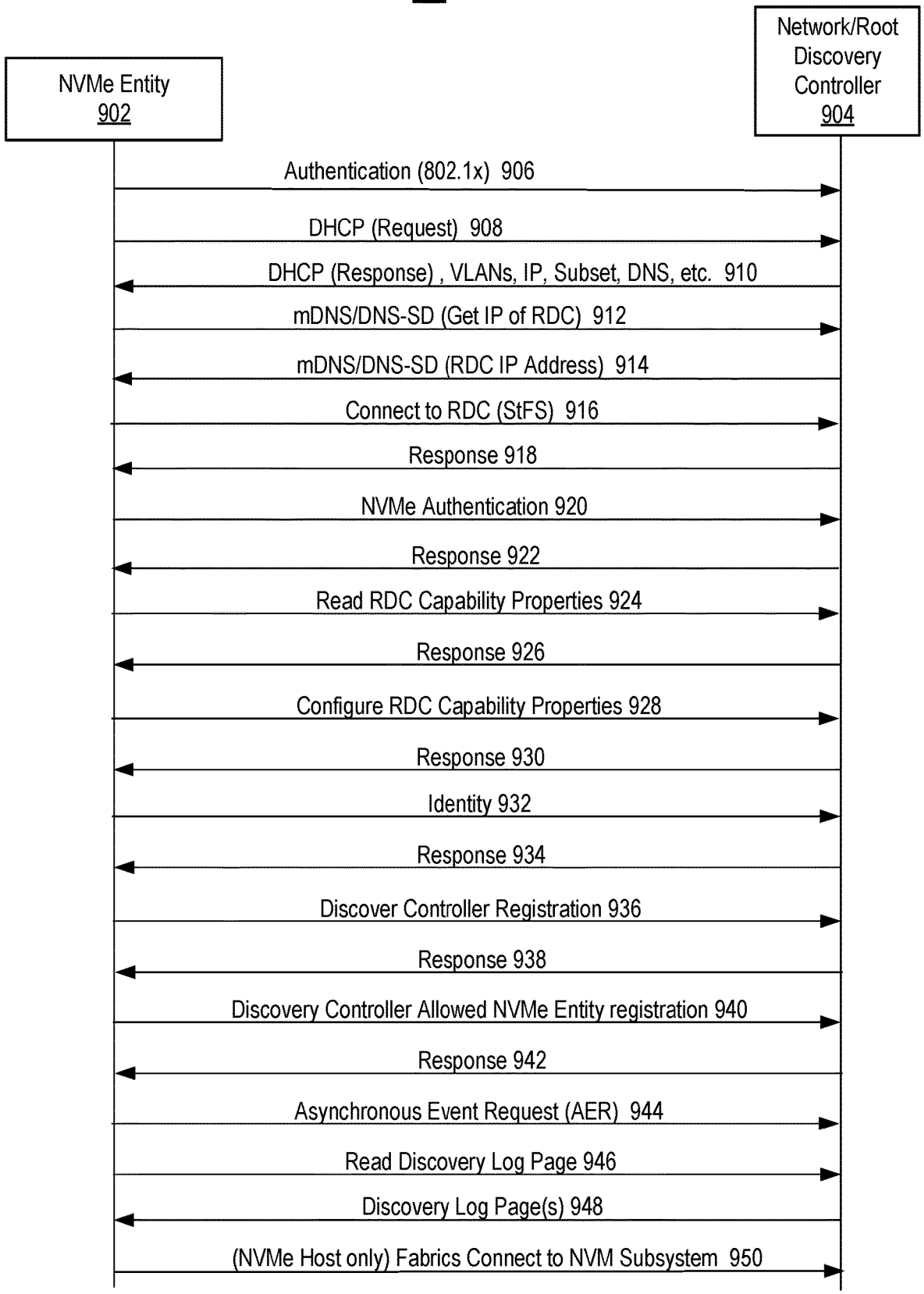
FIG. 9 depicts a flowchart of an exemplary method for communication between an NVMe entity and an StFS according to embodiments of the present disclosure.

FIG. 9 depicts a flowchart 900 of an exemplary method for interaction between an NVMe entity and an StFS according to embodiments of the present disclosure. The following sequence diagram illustrates various interactions, including how discovery controller registration may be used to interact with the StFS service. Recall that the terms "Root Discovery Controller," "RDC," and "StFS" may be treated as synonyms.

The first interaction, step 906, comprises IEEE 802.1x authentication by an NVMe Entity 902, which may be a NVMe Host or NVM subsystem, to a network/RDC 904. In one or more embodiments, this interaction may be optional.

The next interaction 908-910 depicts an interface configuration and VLAN discovery process. In one or more embodiments, this interaction may be optional.

A Root Discovery Controller is obtained via the discovery process depicted at steps 912-914. In one or more embodiments, this interaction may be optional.

Steps 916-918, represent the NVMe entity 902 connecting to the Root Discovery Controller. In one or more embodiments, the Fabric Connect protocol may be used.

An NVMe-oF authentication interaction is depicted at steps 920-922. In one or more embodiments, this interaction may be optional.

A Root Discovery Controller configuration process is illustrated in steps 924-934.

The next interaction 936-938 depicts a Discovery Controller registration process. In one or more embodiments, this interaction may be optional for NVMe hosts. A Discovery Controller allowed NVMe entity registration process is depicted in steps 936-938. In one or more embodiments, this interaction may be optional for NVM subsystems. It shall be noted that a benefit of discovery controller registration processes is that one command format may be used by all end points.

Steps 940-948 depict an example Allowed NVMe Entity Registration (ANER) interaction, which may, in embodiments, be a Target Driven Zoning process. Embodiments of Target Driven Zoning are discussed in more detail in the next section. In one or more embodiments, step 946 allows an NVMe Host or an NVM subsystem to determine the IP Address that should be used to communicate with the other NVMe-oF capable systems.

Finally, step 950 depicts, for NVMe hosts, establishing end-to-end connectivity and performing NVMe discovery of namespaces.

In one or more embodiments, upon registering the transport information with the centralized storage fabric service, a host or subsystem (which should be understood to mean the host or subsystem or its StFS agent) may perform various functions. In one or more embodiments, an NVMe host or NVM subsystem may register or deregister transport information of one or more other elements, using either in-band or out-of-band create, read, update, and delete (CRUD) operations. In one or more embodiments, as discussed above, a host may send a query to the centralized storage fabric service to discover the transport specific information associated with an NVM subsystem or subsystems to which the host has been granted access. Also, in one or more embodiments, the StFS agent may modify the namespace access control mechanism of its NVM subsystem to allow one or more NVMe hosts to access the specific namespaces. In one or more embodiments, the StFS agent may publish a list of the NVMe hosts that have been granted access to a particular NVM subsystem interface (e.g., 320*a*) to the StFS. Also, in one or more embodiments, an NVMe host or NVM subsystem may modify the NVMe-oF connectivity information of one or more of its elements and may also establish connectivity to another element in the system using the best protocol supported by both elements. In one or more embodiments, an StFS agent may update its host NVMe multipathing information and register the updated information with the StFS. Also, in one or more embodiments, the StFS agent may listen for asynchronous events generated by the StFS and perform connectivity action(s) based on those events.

In one or more embodiments, an NVMe host or an NVM subsystem may deregister one or more elements with the centralized storage fabric service. In one or more embodiments, deregistration may be performed in a similar manner and using similar data formats as registration. For example, a discovery controller deregistration command may be an admin command similar to that depicted in FIG. 5. Similarly, the deregistration entry may be similar to that depicted in FIG. 7. One skilled in the art shall recognize, however, that all the same fields used in registration may not be supplied for deregistration. For example, symbolic name may not be included in the discovery controller NVMe deregistration entry.

C. TARGET DRIVEN ZONING FOR ETHERNET (ETDZ) EMBODIMENTS

The prior section presented embodiments that facilitated registration with a centralized root discovery controller. Embodiments herein provide mechanisms to help limit the scope of discovery for end devices via zoning. In Fibre Channel (FC) environments, zoning is typically used for two main purposes: (1) for access control to ensure only authorized hosts can access storage subsystem resources; and (2) to reduce the load on a FC Name Server—that is, when zoning is used, the total number of name server queries that need to be handled by the switch can be dramatically reduced. For example, without zoning, the number of commands that may need to be serviced by the switch increases non-linearly, roughly 2nx(n−1) (where n=the number of N_Ports visible to each end device).

Thus, for at least these reasons, zoning is beneficially provided in systems even when the transport is Ethernet based. However, one of the problems with zoning is that it places an administrative burden on users for CRUD zoning definitions as the connectivity needs of the environment change (i.e., manually grouping pairs of end devices together via a transport layer identity) (e.g., zoning by World Wide Port Names (WWPN) in FC). To address these issues, embodiments of target driven zoning for Ethernet (eTDZ) have been developed and are presented herein.

To apply target driven zoning principles to Ethernet, one must consider that access control information (i.e., zoning) with NVMe-oF is not symmetrical. In other words, unlike with FC where each end device can be solely identified by the same type of identifier (e.g., Port_Name), NVMe-oF typically require specific identifiers for each NVMe entity element.

Thus, in one or more embodiments, NVMe hosts may be identified by a combination of one or more identifiers (e.g., their "HOSTNQN" and "HOSTID"), and NVM subsystems may similarly be identified by a combination one or more of their identifiers (e.g., "SUBNQN")—although different identifiers may be additional or alternatively used. Once these values and the relationships between them have been provided to the StFS, it may use the information provided for a number of functions, including but not limited to:

(1) limit the number of entries returned to each NVMe entity in response to a request (e.g., a Get Log Page request). In one or more embodiments, the entries returned to the NVMe entity may be limited to those entries to which the NVMe entity has been granted access. Embodiments of this approach may be considered to be analogous to soft zoning enforcement with FC; and (2) update Access Control Entries (ACEs) on the switch interfaces to prevent an NVMe entity from accessing a resource to which it has not been granted access. Embodiments of this approach may be considered to be analogous to hard zoning enforcement may be performed via a combination of the IP Address and the protocol number in use by the end devices.

Regardless of the enforcement mechanism (i.e., soft or hard zoning), traditionally the relationships between the relevant elements of the NVMe entities had to be configured on the switches; and typically, this has been done via a fabric management application or switch element manager in order to configure these relationships explicitly. However, as mentioned earlier, this manual zoning processing places a significant burden on users, particularly if the network is large, changes frequently, or both. Accordingly, embodiments herein mitigate these problems by allowing an NVMe subsystem to publish a list of the NVMe hosts that have been granted access to namespaces behind a given NVM subsystem interface.

Figure 10A:
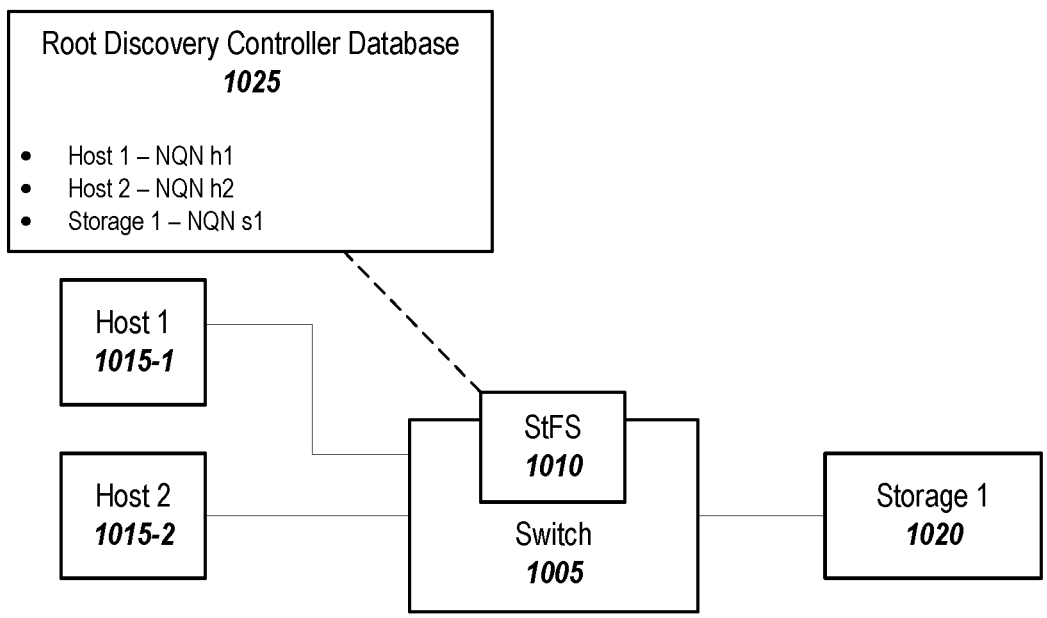
FIGS. 10A&B depict an NVMe-oF network that includes Storage Fabric service (StFS) functionality that supports registration and access control, according to embodiments of the present disclosure.

FIGS. 10A&B depicts an NVMe-oF system that includes Storage Fabric service (StFS) functionality that supports registration and zoning, according to embodiments of the present disclosure. Depicted in FIG. 10A is a switch 1005 that includes an StFS services component 1010 that support registration and zoning, according to embodiments of the present embodiment. For sake of illustration, assume that each of the NVMe entities (i.e., Storage 1 1020, Host 1 1015-1, and Host 2 1015-2) have already registered with the StFS service 1010 using one or more of the registration methods described above in Section B. As part of the registration, the StFS service 1010 has created a root discovery controller data store 1025 (or added to an existing data store) the registered entries for each registered NVMe entity element. In the depicted embodiment, the data store 1025 includes an NQN, IP address, or both for each registered NVMe entity element.

Figure 11:
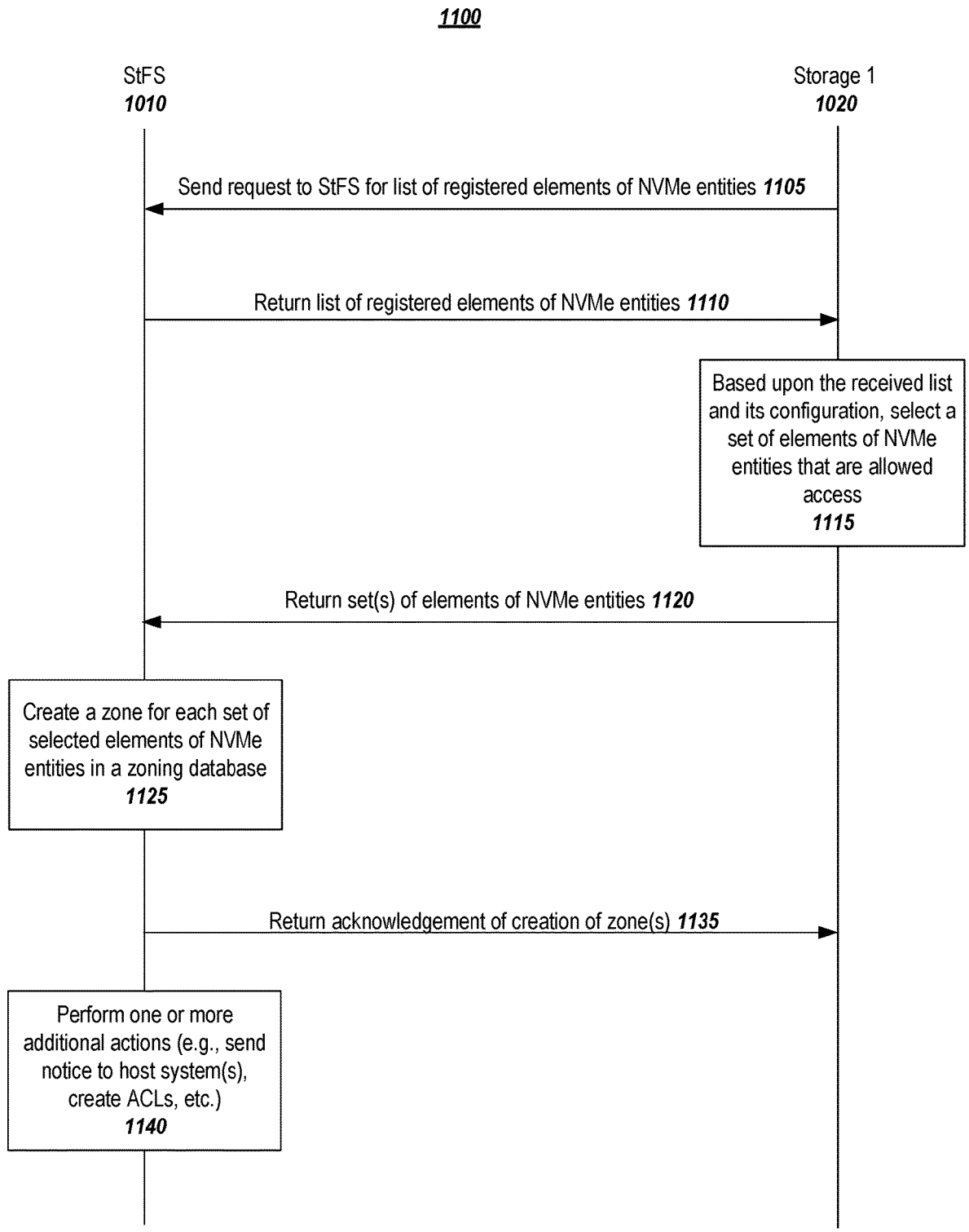
FIG. 11 depicts a method for an NVMe entity to obtain from the StFS as part of the access control process information about elements of NVMe entities that have registered with the StFS, according to embodiments of the present disclosure.

FIG. 11 depicts a method for an NVMe element (e.g., an NVM subsystem) to obtain from the StFS as part of the zoning process, information about elements of NVMe entities registered with the StFS, according to embodiments of the present disclosure. An NVM subsystem (e.g., Storage 1 1020) may send (1105) a request to the centralized storage fabric service (e.g., StFS 1010) for a list of registered elements of NVMe entities. In one or more embodiments, the request includes an indication that a full Discovery Log Page is being requested. In one or more embodiments, the request may be a "Get Log Page" Admin command. The StFS component 1010 receives the requests and obtains a list of registered elements of NVMe entities for the data store 1025 and returns (1110) the list to the requester, which in this example is Storage 1.

Based upon the received list and the configuration settings of the NVM subsystem, it selects or identifies a set of elements of NVMe entities from the received list to which access can be granted. In one or more embodiments, the configuration settings of the NVM subsystem includes information identifying which hosts are allowed access to its storage. It shall also be noted that the NVM subsystem may also configure or identify: (1) hosts for more than one storage element for which it is responsible; (2) other storage elements (e.g., to set up data replication); or (3) both.

Having selected the set or sets of appropriate elements of NVMe entities, the NVM subsystem returns (1120) the list or lists to the StFS 1010. In one or more embodiments, the response may include a number of allowed elements, which specifies the number of elements of NVMe entities that the NVM subsystem are indicating as being allowed access to a storage element or elements. In one or more embodiments, the StFS is provided an allowed NVMe entry for each such element. The allowed NVMe entry may include an entry type, an NVMe qualified name (NQN) for identifying the NVMe element, a transport address for specifying an address for the NVMe element, and a host identifier if the NVMe element is a host. In one or more embodiments, return a list (e.g., an allowed entity registration message) for each interface/element that is allowing access to the listed elements.

In one or more embodiments, the allowed entity registration process may parallel aspects of the registration process discussed above. For example, an Allowed NVMe Entity Registration (ANER) message having a same or similar structure as depicted in FIG. 5 may be communicated to the StFS, in which the ANER indicates a number of elements that will be allowed. In one or more embodiments, data about each allowed is provided in an allowed entity entry. Depending upon the underlying protocol, the StFS may request the specified number of allowed NVMe entries or may receive them automatically. In one or more embodiments, the request or command may be of the form of an Admin command, such as described in the NVM Express™ Base Specification Rev. 1.4 (which is incorporated herein by reference in its entirety), which is produced by the NVM Express organization-a non-profit consortium of technology industry leaders. It shall be noted that other types and formats of command may be employed.

In one or more embodiments, the data for each allowed entity entry (AEE) may be of a format that is the same as or similar to the format depicted in FIG. 6. An allowed entity entry may include one or more data blocks, in which each data block corresponds to one of the allowed entities and there are the same number of entries as set forth in the AER message.

In one or more embodiments, an allowed entity entry may be the same as or similar to that depicted in FIG. 7. It shall be noted that the depicted entry embodiment is only one example and that different configurations/layout, different fields (or parameters), and different data field sizes may be used. It shall also be noted that NVMe hosts and NVM subsystem may use the same or different formats. In one or more embodiments, the allowed entity entry (AEE) may include such parameters as:

(1) Transport Type (TRTYPE), which specifies the NVMe transport type;

(2) Subsystem Type (SUBTYPE);

(3) Transport Address (TRADDR), which indicates: (a) for NVM subsystems, the address of the NVM subsystem port that may be used for a connect command, and (b) for NVMe hosts, the address of the host interface that will be used to connect to NVM subsystem or to a controller on the NVM subsystem;

(4) Transport Specific Address Subtype (TSAS), which specifies additional information about the transport address of item (3) (above);

(5) If an NVMe hosts, an NVMe Qualified Name (NQN) that uniquely identifies the host system;

(6) If an NVM Subsystem, an NVM Subsystem Qualified Name (SUBNQN), which indicates the NVMe Qualified Name (NQN) that uniquely identifies the NVM subsystem; and (7) If a Host, a Host Identifier (HOSTID), which is used for NVMe hosts and may have the same definition as the Host Identifier defined in the "Host Identifier" section of the NVMe Base specification, which is incorporated by reference herein.

Returning to FIG. 11, In one or more embodiments, the StFS receives the list or lists (i.e., the allowed entity entry or entries (AEE)) and creates (1125) a zone for each set of selected elements of NVMe entities in a zoning data store. Assume, for purposes of illustration, that Storage 1 1020 is configured to allow access to Host 1 1015-1 and Host 2 1015-2 and therefore returns a set comprising identifiers indicating that Storage 1, Host 1, and Host 2 are to be formed into a zone. In one or more embodiments, the identifier may be the NQN for the NVMe entity and, may also include its IP address, although a different identifier or identifiers may additional or alternatively be used.

Figure 10B:
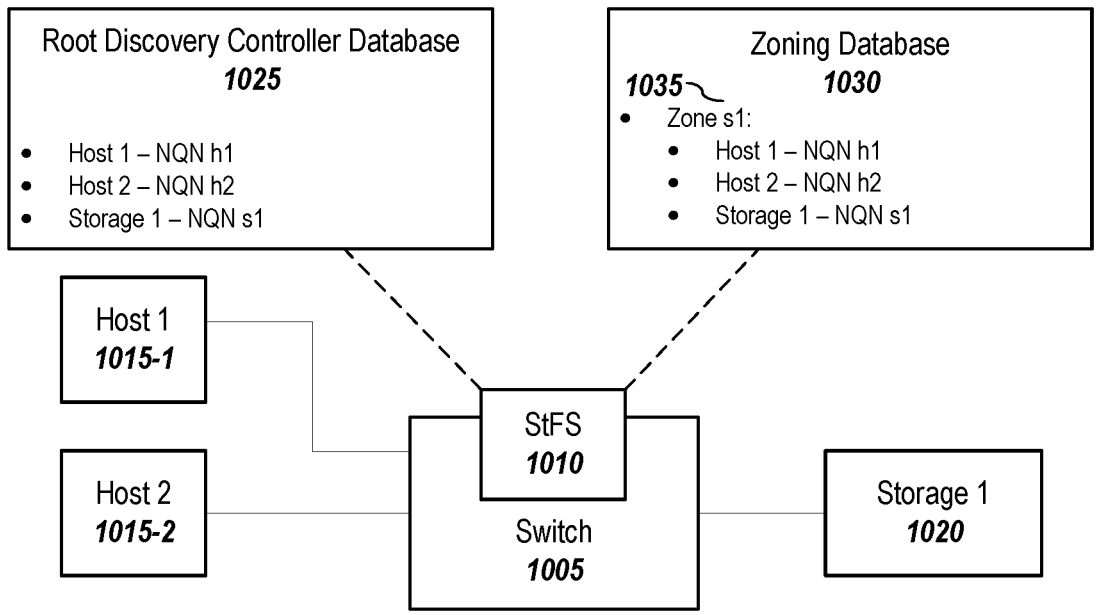
FIGS. 10C&D depict an alternative NVMe-oF network that includes Storage Fabric service (StFS) functionality that supports registration and access control (e.g., zoning), according to embodiments of the present disclosure.
FIG. 10D graphically illustrates that the StFS has added an entry in the zone data store, in which Host 1, Host 2, Host 3, and Storage 1 are members of the same zone.

FIG. 10B graphically illustrates that the StFS 1010 has created a zone entry 1035 in a zone data store 1030, in which Host 1, Host 2, and Storage 1 are identified as being members of that zone 1035. In one or more embodiments, the identifier for the various NVMe entities elements in the zone data store are the NQN for the NVMe entity element and may also include its IP address, although a different identifier or identifiers may additional or alternatively be used. In one or more embodiments, the StFS returns (1130) an acknowledgement that a zone corresponding to the set of selected elements has been created.

In one or more embodiments, the StFS may perform (1135) one or more additional actions, such as sending one or more notices (such as an asynchronous event notification (AEN)), to the appropriate NVMe host systems, create or update one or more Access Control Lists (ACLs), and the like.

Figure 12:
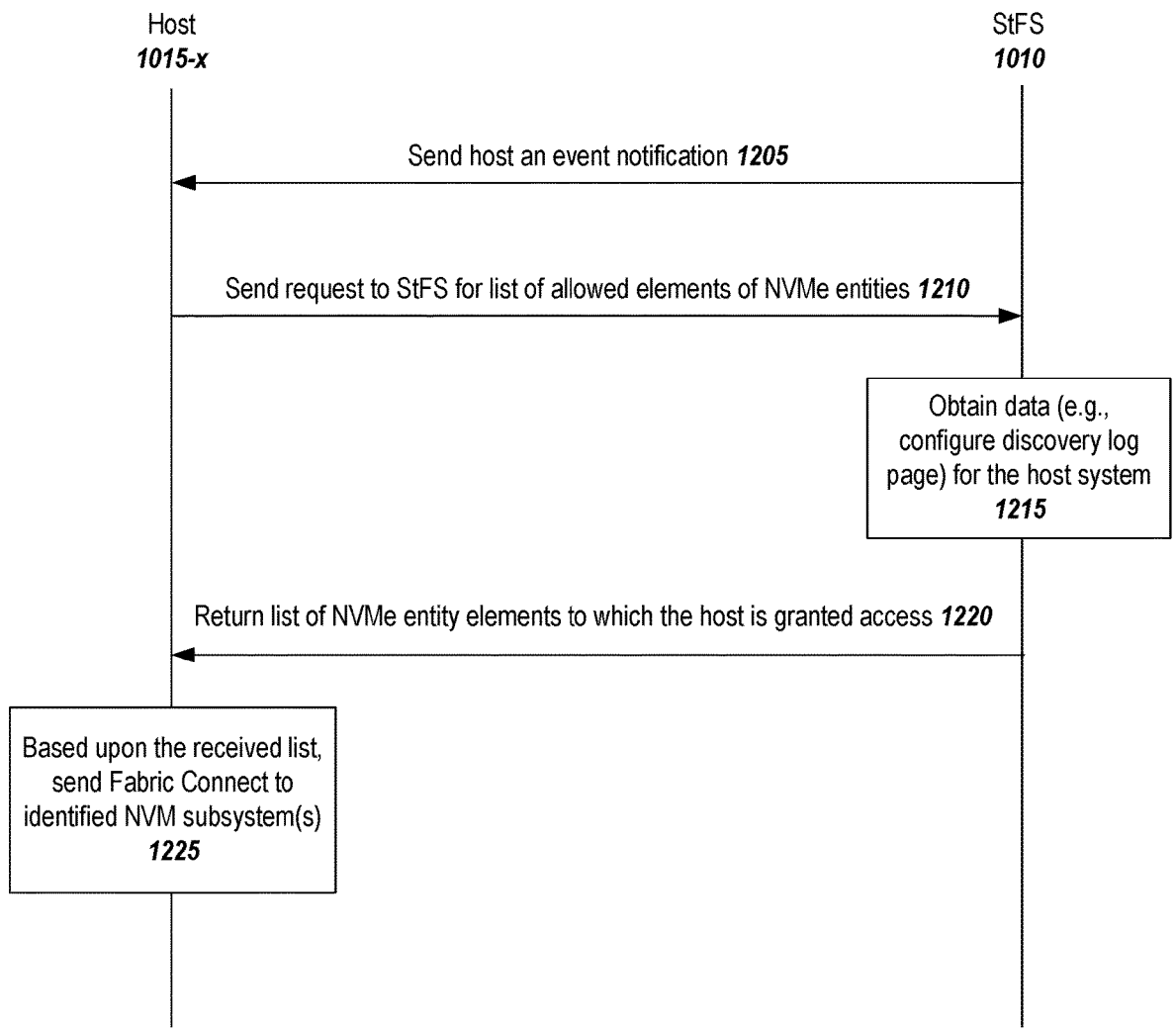
FIG. 12 depicts a method for an NVMe entity (e.g., an NVMe host) to obtain from the StFS as part of an access control process information about elements of NVMe entities to which the NVMe entity has been granted access, according to embodiments of the present disclosure.

FIG. 12 depicts a method for an NVMe entity (e.g., an NVMe host) to obtain from the StFS as part of the zoning process information about elements of NVMe entities to which the NVMe entity has been granted access, according to embodiments of the present disclosure. In one or more embodiments, the NVMe entity (e.g., a host 1015-x) may receive (1205) from the centralized storage fabric service (e.g., StFS 1010) a notification. In one or more embodiments, the notification is an asynchronous event notification (AEN), which may have been prompted to be sent as a result of a zone creation in which the host is a member. For example, the creation of zone s1 1035 in the zoning data store 1030 as graphically depicted in FIG. 10B as part of the method of FIG. 11 may result in the StFS 1010 notifying (1205) Host 1 1015-1, Host 2 1015-2, or both.

Responsive to receiving the notification, the NVMe entity (e.g., host 1015-*x*) sends (1210) a request to StFS for a list of elements of NVMe entities (e.g., storage elements of an NVM subsystem) to which the host has been granted access. In one or more embodiments, the request may be a Get Log Page command as defined by NVMe-oF. It shall be noted that the host may send the request upon other triggers and at other times, such as at regular intervals, upon initial configuration, upon power on, etc. In one or more embodiments, the StFS receives the request and obtains (1215) the appropriate data for the host, which may be obtained by querying the zoning data store. For example, in one or more embodiments, the StFS may configure (1215) a discovery log page for the host system that contains the relevant information. In one or more embodiments, the discovery log page may comprise zero or more discovery log entries and each entry may comprise transport layer information (e.g., an IP Address) for each subsystem interface that this host is allowed to access.

It shall be noted that obtaining or configuring the information may be done in response to the request or may be done in advance. Having collected the appropriate information for the host, the StFS returns (1220) the list of NVMe entity elements to which that host has been granted access.

In one or more embodiments, given the received list of one or more NVMe entity elements, the host connects to these NVMe entity elements. For example, in one or more embodiments, the host may send to a Fabric Connect message to each storage element identified in the received list. For example, in one or more embodiments, as illustrated in FIG. 9, a host may perform steps 916 through 934 and then steps 944 through 950.

Figure 10C:
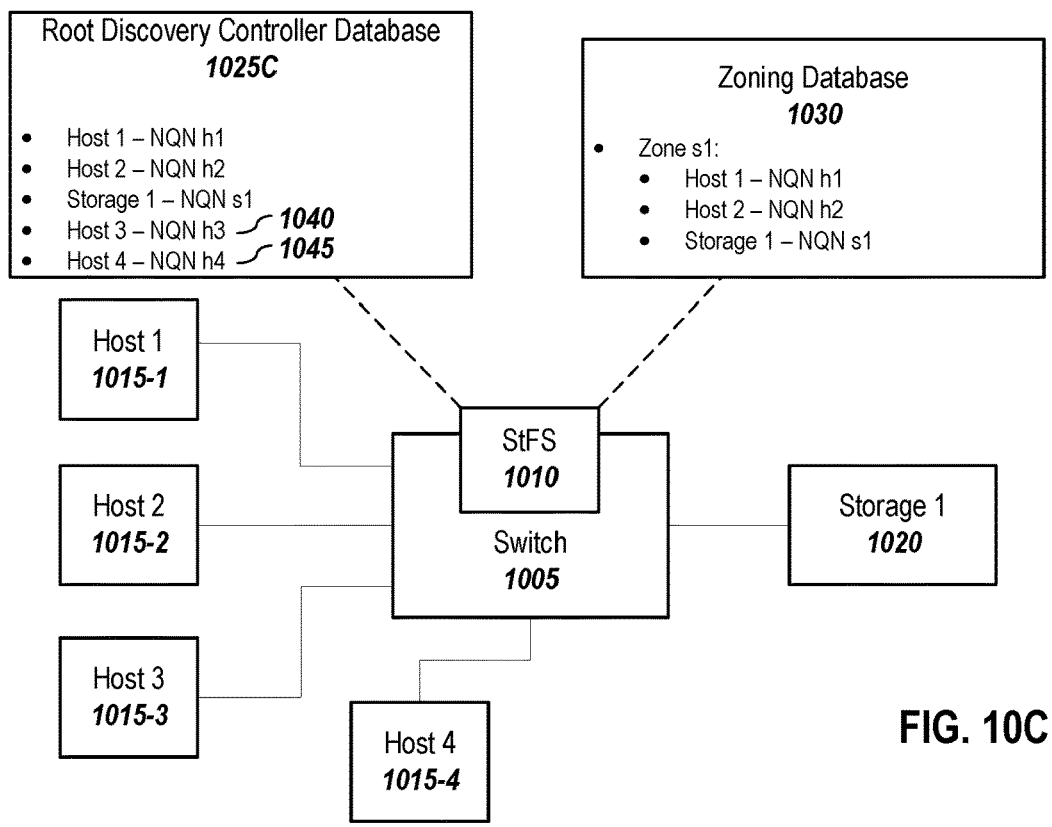

FIGS. 10C&D and 13 represent an embodiment of facilitating access control through zoning in which one or more new hosts have been added to the overall system. FIG. 10C illustrates that two new hosts, Host 3 1015-3 and Host 4 1015-4, have been added to the overall network system. As part of their additions to the system, the new hosts have registered via the centralized root discovery controller with the StFS 1010, so that they have registration entries (e.g., registration entries 1040 and 1045) in the root discovery controller data store 1025C.

Figure 13:
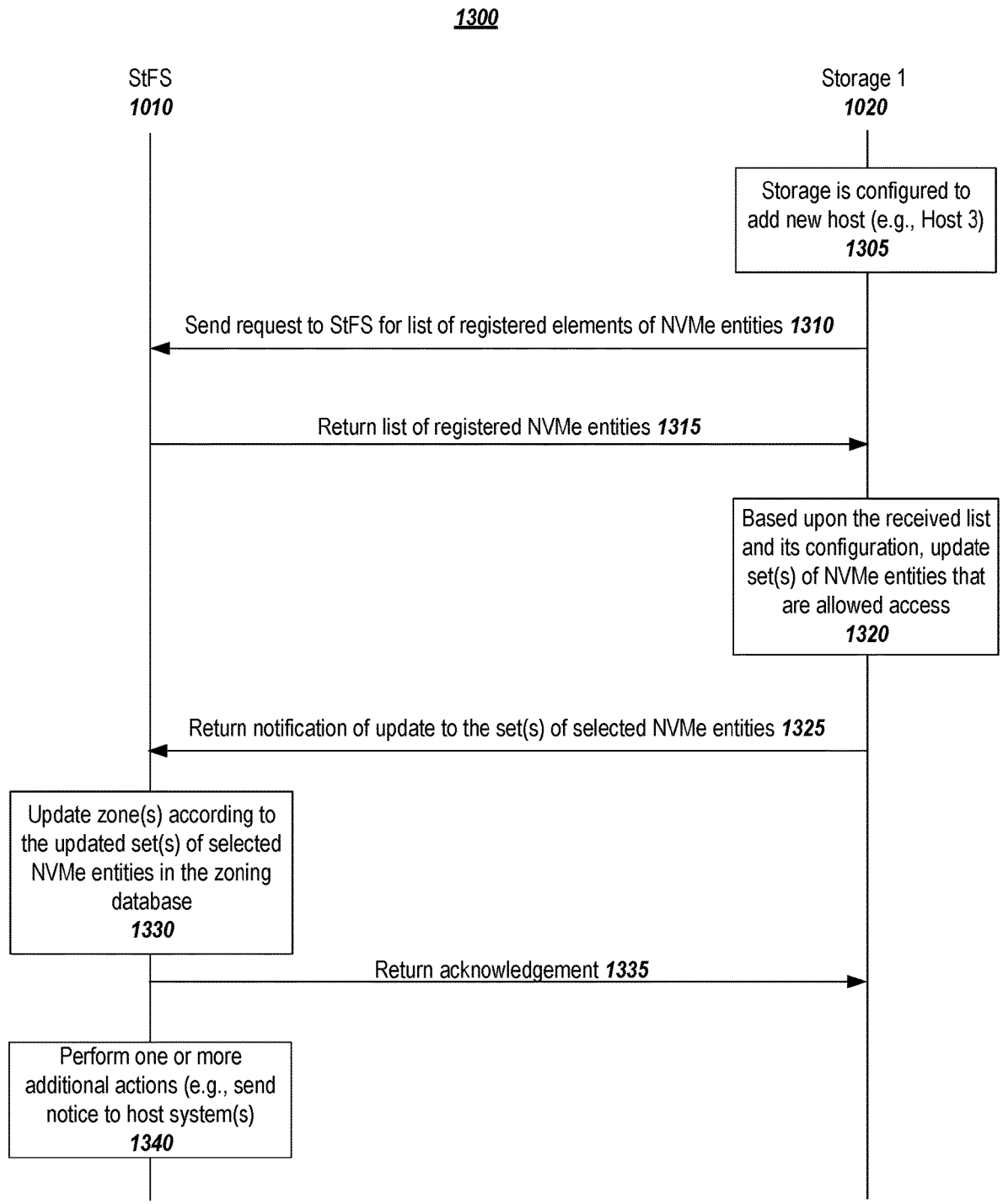
FIG. 13 depicts a method for facilitating access control in NVMe system after a change has occurred in the system, according to embodiments of the present disclosure.

Turning now to FIG. 13, FIG. 13 depicts a method for an NVMe element (e.g., an NVM subsystem) to participate in updating access control, according to embodiments of the present disclosure. Assume for purposes of illustration that one of the new hosts—Host 3 1015-3—is to be granted access to Storage 1 1020. In one or more embodiments, Storage 1 is configured (1305) to accept a new host or host (e.g., Host 3) in its list of approved hosts. In one or more embodiments, the change to its configuration prompts the NVM storage subsystem (i.e., Storage 1) to send (1310) a request to the centralized storage fabric service for a list of registered elements of NVMe entities, which may be a request for a full discovery log page in like manner as described in various embodiments with reference to FIG. 11 (above). It shall be noted that the NVM subsystem may send the request to the StFS upon other triggers and at other times, such as at regular intervals, upon initial configuration, upon power on, etc. In one or more embodiments, the request may be a "Get Log Page" Admin command. The StFS component 1010 receives the requests and obtains a list of registered elements of NVMe entities for the data store 1025 and returns (1110) the list to the requester (i.e., Storage 1). Note that, in the depicted embodiment, the list now includes the newly registered Host 3 1015-3 and Host 4 1015-4.

Based upon the received list and the NVM subsystem's configuration settings which includes an indication that Host 3 is an allowed host, it selects or identifies a set of elements of NVMe entities from the received list to which access can be granted; in this example, it is Hosts 1-3 but not Host 4. Having selected the set of appropriate NVMe entities, the NVM subsystem returns (1325) a notification of updated selected NVMe entities to the StFS. In similar manner as explained with respect to FIG. 11, the notification may be an Allowed NVME Entity Registration (ANER), which contains or will correspond to the communication of the selected allowed entity entry (AEE) or entries. In one or more embodiments, a full replacement list of the selected NVMe entities (e.g., Host 1, Host 2, and Host 3) may be communicated (e.g., an AEE entry for each selected NVMe entity) or may be merge list that includes the changes (i.e., add Host 3 to Zone s1).

Figure 10D:
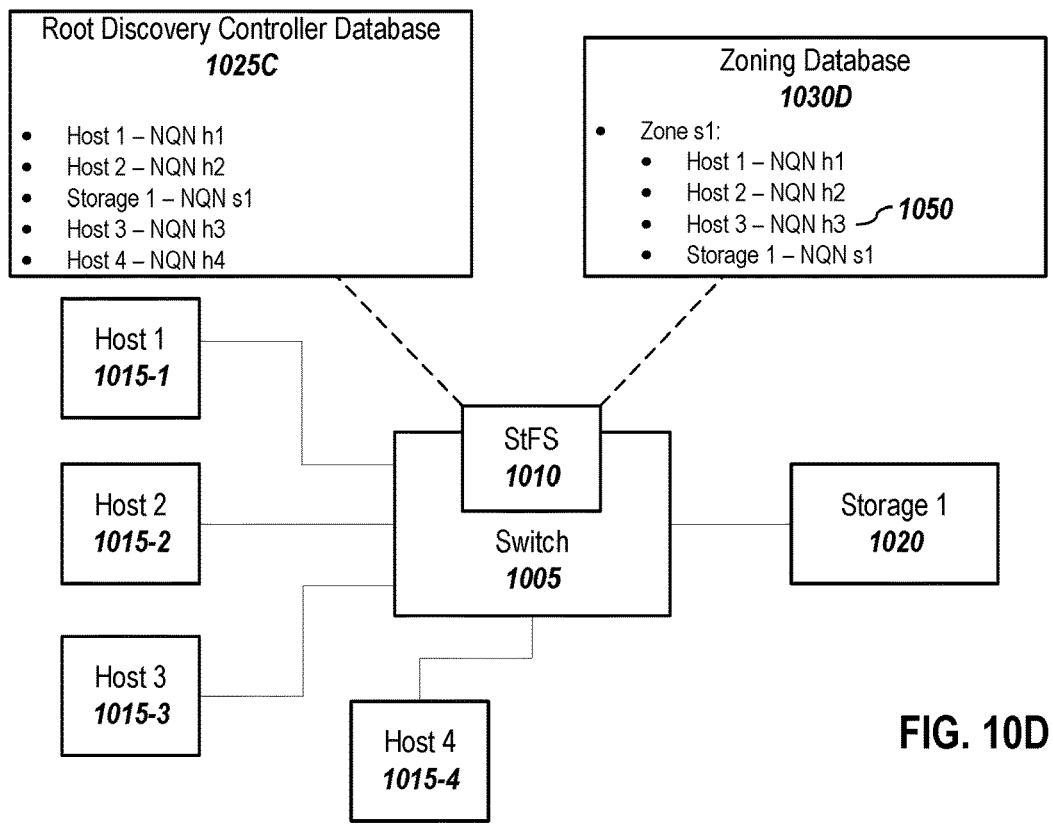

In one or more embodiments, the StFS receives the list and updates (1330) the zoning data store. As illustrated in FIG. 10D, the StFS has added Host 3 as a member 1050 to the appropriate zone in the zone data store 1030D; thus, the data store 1030D now includes identifiers indicating that Storage 1, Host 1, Host 2, and Host 3 are members of zone s1. In one or more embodiments, the identifier may include, for each NVMe entity, its NQN, its IP address, or both—although a different identifier or identifiers may additional or alternatively be used.

In like manner as discussed above with respect to FIG. 11, the StFS may return (1335) an acknowledgement that the zoning data store has been updated corresponding to the set of selected elements, and the StFS may perform (1340) one or more additional actions, such as sending one or more notices to the appropriate NVMe host systems, create Access Control Lists (ACLs), etc.

It shall be noted that the NVMe entities may include an agent that interacts with the centralized fabric storage services to effect zoning as illustrated by embodiments in this section. It shall also be noted that the zoning functionality may be incorporated into a single agent that facilitates registration functionality as discussed in the prior section.

D. IMPLICIT DISCOVERY CONTROLLER REGISTRATION EMBODIMENTS

Section B, above, presented embodiments that facilitated explicit or direct registration with a centralized storage fabric service. As discussed in detail above, embodiments of explicit registration involve sending information to the StFS controller about an NVMe host or an NVM subsystem, which facilities registration in a centralized registration datastore and provides information that may be used for other purposes, including discovery and zoning, embodiments of which are also discussed in Section C, above.

In addition to, or as an alternative to, explicit registration of NVMe entities, it may be beneficial to allow for the automatic implicit registration of NVMe entities. In one or more embodiments, explicit registration works well for NVMe entities that include support for interfacing with an StFS controller. For example, in one or more embodiments, an NVMe entity includes an StFS client that is able to send registration commands and use target driven zoning commands. However, there may be some devices that are not configured to support such services or are not capable of running an StFS client. For example, an Ethernet bunch of flash (EBOF) device (e.g., NVMe SSDs in a disk array enclosure) that may have a management interface and at least one data plane connection but may not be capable of running a full StFS client. Or, a device may have limited management interface (e.g., a command line interface (CLI) or graphical user interface (GUI)) that does not allow for configuring it explicitly so that it can register itself directly with the StFS controller. Thus, such situations create a problem if only explicit discovery were supported-if an NVMe entity comes online, the system may be unable to discover such devices because they have not registered any information. Thus, in one or more embodiments, supporting automatic implicit registration of such devices allows from them to be discovered, which facilitates other services such as zoning.

In one or more embodiments, implicit registration is enabled by having the StFS controller take an active role in registering other devices. Instead of waiting for registration commands to arrive from attached NVMe entities, the StFS controller may use the presence of certain traffic, such as a Link Layer Discovery Protocol (LLDP) exchange or a Multicast Domain Name System (mDNS) request, to implicitly detect and register NVMe entities. In one or more embodiments, the StFS may monitor for such traffic at various events, such as initial connection of the device, or according to a schedule. In one or more embodiments, the message from an NVMe entity includes an indicator that it is NVMe capable. For example, in one or more embodiments, a TLV (type-length-value) field or fields may be defined for a protocol such as LLDP that allow the StFS controller to recognize that an NVMe entity, such as an EBOF, is coming online and should be implicitly registered. Or, for example, via one or more mDNS requests, the StFS may see a notification that indicate that the sending device has a subordinate discovery controller or is an NVMe entity that lacks a discovery controller. In these cases, the StFS may be configured to perform implicit registration on behalf of such devices.

In one or more embodiments, the StFS controller may act as a host and send a command, such as a Fabrics connect command, to the NVM storage end device as if it were a host. As a result, the StFS would receive information (e.g., via NVMe Get Log Page commands) from the NVMe end device about interfaces associated with the that device, which the StFS can use to create an implicit registration or registrations in a centralized registration data store (e.g., a root discovery controller database). As a result of this process, the NVMe device is implicitly registered and discoverable—the device can be discovered, which facilitates other processes, such as provisioning and zoning.

Figure 14:
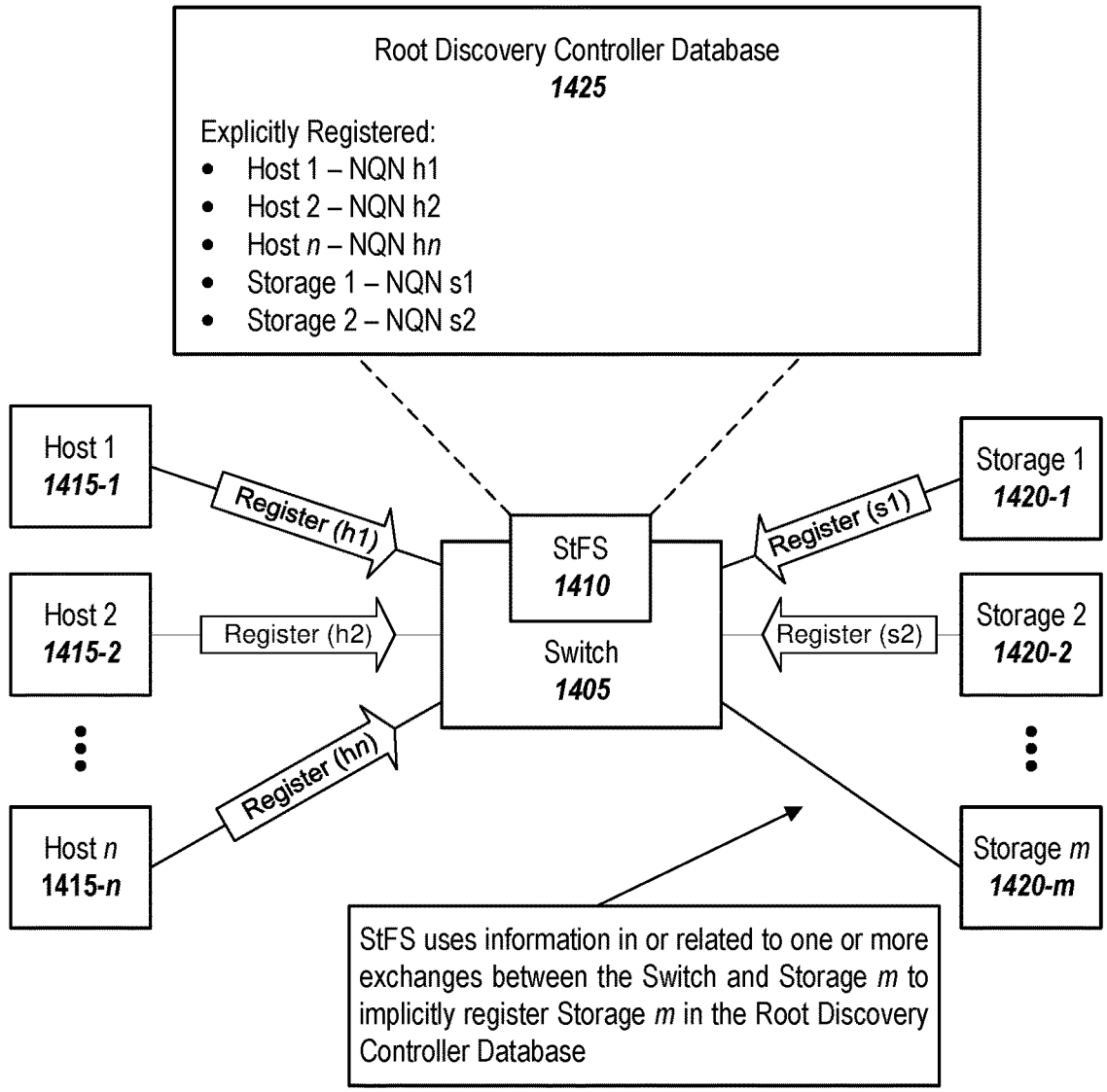
FIG. 14 depicts an NVMe-oF network that includes Storage Fabric service (StFS) functionality, according to embodiments of the present disclosure.
Figure 15:
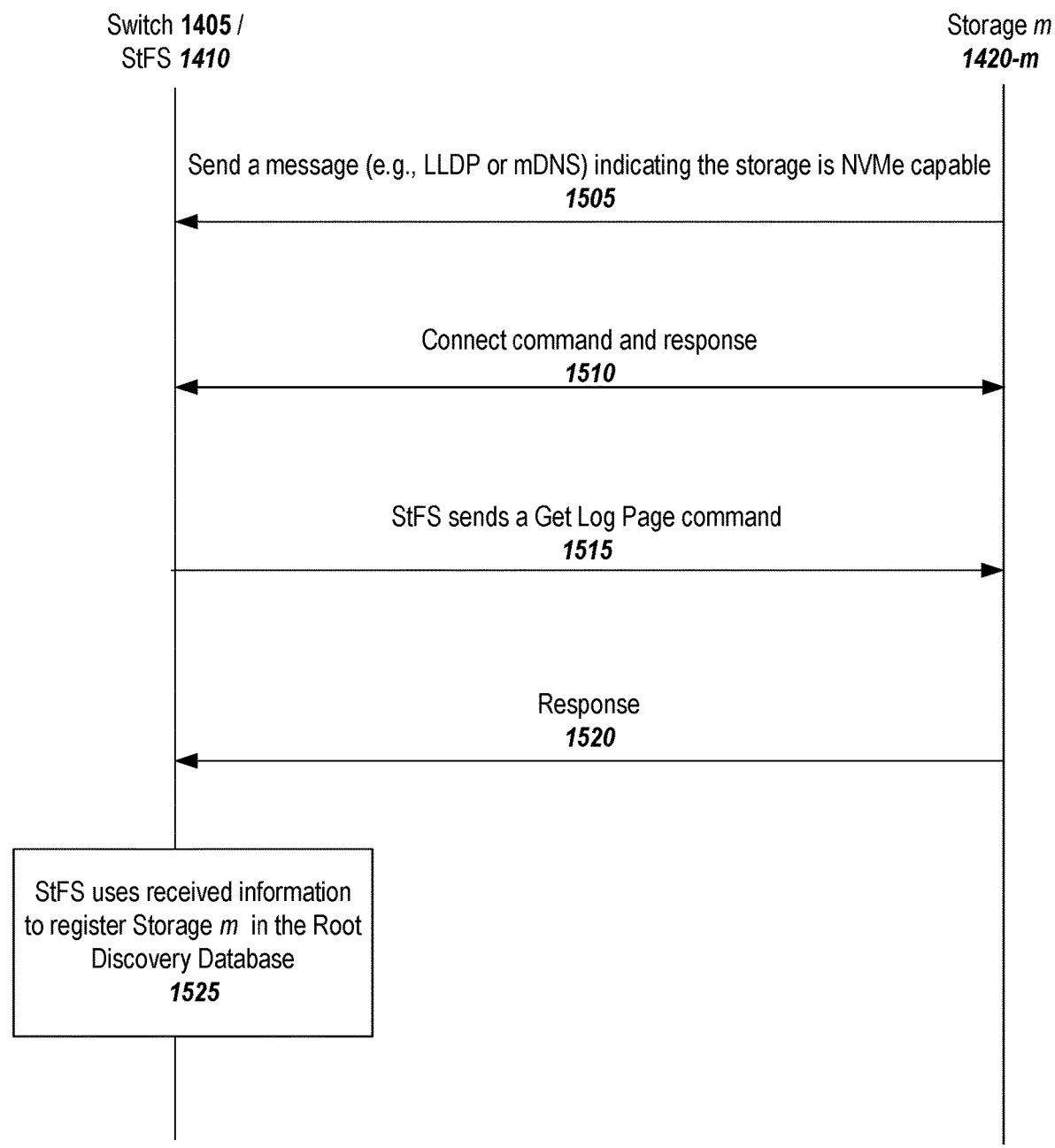
FIG. 15 depicts a method for implicit registration, according to embodiments of the present disclosure.

Consider, by way of illustration, the example system depicted in FIG. 14. Shown in FIG. 14 is an NVMe-oF network 1400 that includes Storage Fabric service (StFS) functionality 1410 that supports storage fabric services, such as registration and access control, according to embodiments of the present disclosure. As illustrated in FIG. 14, Host 1 1415-1 through Host n 1415-*n*, Storage 1 1420-1, and Storage 2 1420-2 have all explicitly registered with the StFS 1410 and are included in the centralized registration datastore (i.e., root discovery controller database 1425). Assume, for sake of illustration, that Storage m 1420-*m* is an EBOF device that was just added to the network 1400. FIG. 15 depicts a method for implicit registration of Storage m, according to embodiments of the present disclosure.

As depicted in FIG. 15, the storage system, Storage m 1420-*m*, transmits (1505) a message (e.g., an LLDP message or a multicast DNS request) to the switch 1405 that indicates that the device 1420-*m* is NVMe capable. Upon receiving the communication from Storage m, the switch 1405 forwards this request to the centralized storage fabric services (e.g., StFS 1410). In one or more embodiments, the StFS controller 1410 sends (1510) a command (e.g., a Connect command) to Storage m 1420-*m*, and Storage m responds (1510). In one or more embodiments, if the Connect command and response successfully completes, the StFS transmits (1515) a request for information (e.g., a Get Log Page command) to Storage m 1420-*m*, which will return (1520) information to the StFS 1410. In one or more embodiments, the StFS 1410 uses at least some of the information from the Connect command and the fabric connection to implicitly register Storage m in a centralized registration datastore (e.g., root discovery controller database 1425). In one or more embodiments, the information may comprise an indication the type of NVMe entity (e.g., NVM subsystem), transport address information and transport service information that specify a communication endpoint for an element of the NVMe entity, and a NVMe Qualified Name (NQN). In one or more embodiments, a communication endpoint information represents information used for communicating with a fabric port and may include such information as IP address, protocol identifier (e.g., TCP or UDP), and port number.

Figure 16:
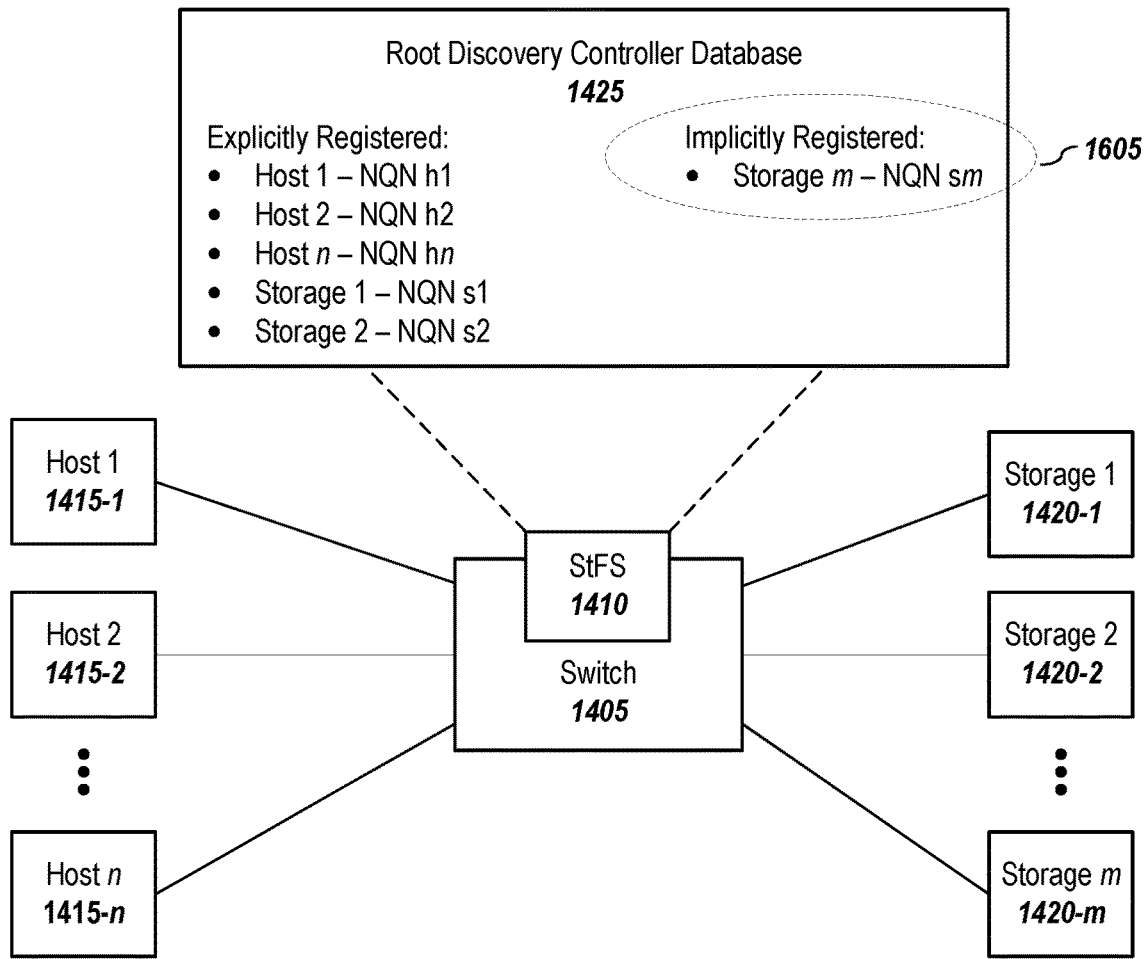
FIG. 16 illustrates the system of FIG. 14 in which an NVMe entity has been implicitly registered, according to embodiments of the present disclosure.

FIG. 16 illustrates the system 1400 of FIG. 14, however, the root discovery controller database 1425 now includes an entry 1605 for Storage m, which has been entered on its behalf by the StFS controller 1410. Because Storage m is now registered, its information is available for other elements in the NVMe-oF system 1400 to discover, which facilitates other network services, such as provisioning and zoning.

Figure 17:
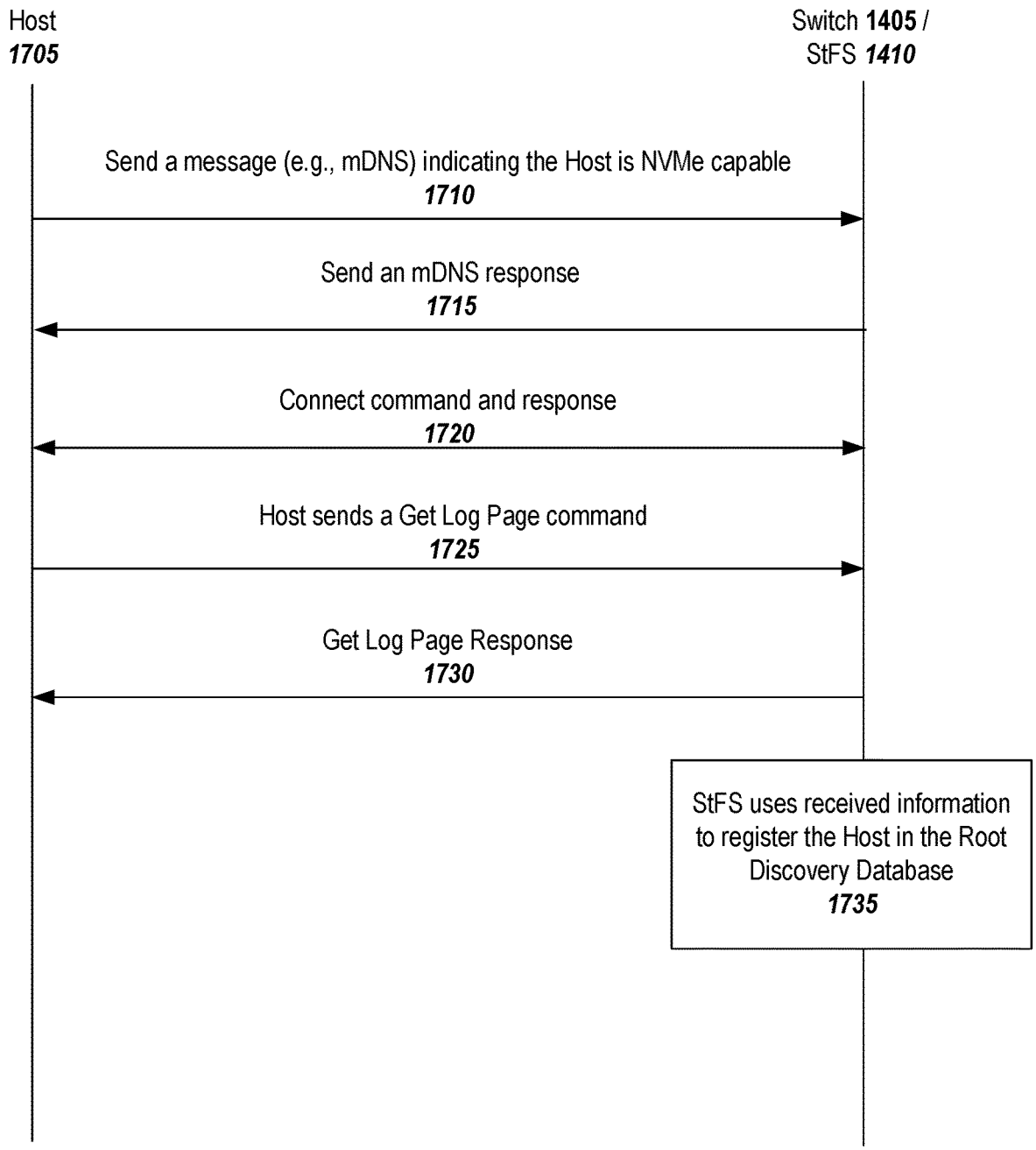
FIG. 17 depicts a method for implicit registration of an NVMe host, according to embodiments of the present disclosure.

In one or more embodiment, the StFS may implicitly register an NVMe host in a similar manner as described above. FIG. 17 depicts a method for implicit registration of a host, according to embodiments of the present disclosure. As depicted in FIG. 17, the host, Host 1705, transmits (1710) a message (e.g., an mDNS request) to the switch 1405 that indicates that the device 1420-*m* is NVMe capable. In one or more embodiments, the StFS controller 1410 sends (1715) a response, and the switch/StFS and the host interact (1720) via a command and response (e.g., a Connect command and response). As illustrated in the embodiment of FIG. 17, the host transmits (1725) a request for information (e.g., a Get Log Page command) to the StFS, which returns (1730) information to the host 1705. In one or more embodiments, the StFS 1410 uses at least some of the information extracted from the received data and the fabric connection to implicitly register the host 1705 in a centralized registration datastore (e.g., root discovery controller database 1425). In one or more embodiments, information from the Get Log Page interchange may not be used in implicit registration; thus, in one or more embodiments, the StFS may perform implicit registration sooner (e.g., after step 1720). In one or more embodiments, the extracted information may comprise an indication the type of NVMe entity (e.g., host), a transport address for specifying a communication endpoint for an element of the NVMe entity, and a NVMe Qualified Name (NQN). In one or more embodiments, a determination that the end device is a host may be made by: (1) a host neither responding to nor advertising an NVMe-discovery service via mDNS; (2) a host not describing itself as an NVM subsystem via LLDP; and/or (3) a host sending a Connect command to the discovery controller.

In one or more embodiments, the system may be configured to support both implicit and explicit registration processes. For example, the system may be configured so that when a device initially connects to the network, it undergoes an implicit registration process, such as one described above. Subsequently, the device may explicitly register, which may include additional information, such as symbolic name, which would not have been extracted or may not have been available as part of the implicit registration process. In one or more embodiments, since the StFS already knows and has registered some information about the NVMe entity, the StFS may request just a subset of information; thereby reducing the amount of information that is communicated. Alternatively, the StFS may request all of the information that is contained in a full discovery controller registration command as discussed above in Section B to ensure that the StFS has correctly and completely captured information for the implicit registration, to keep the explicit registration process consistent, or for other reasons.

Given implicit registration, one or more additional procedures may be implemented. To avoid duplicating efforts, an NVMe entity may signal to the StFS controller that it will be explicitly registering, and therefore, the StFS controller can forego implicitly registering that NVMe entity. For example, an indicator, such as a TLV field, may be specified and used in the LLDP protocol by the NVMe entity to indicate to the StFS controller during an initial connection that the NVMe entity will subsequently explicitly register so the StFS controller can skip implicitly registering the NVMe entity. Other efficiencies may also be implemented. Consider, by way of illustration, the following example. Assume an NVMe entity, which has an StFS client, connects to an NVMe-oF network. In one or more embodiments, the StFS client is configured to know that as part of the LLDP exchange, the NVMe entity will be implicitly registered by the StFS controller. For efficiency, the StFS client may withhold responding to mDNS requests because it knows that the StFS client has registered it with the StFS central registration datastore; thus, it need not ever respond to mDNS requests.

It should be noted that implicit registration is also beneficial in several NVMe host situations. Consider situations in which the NVMe host functionality is limited. One example may be that a host, with a standard NVMe driver, performs mDNS and discovers the StFS controller (e.g., StFS 1405). However, the host does not have a full StFS client but rather just discovery functionality, which it can use to discover whether the network has or does not have an StFS central controller. When the host connects to the StFS discovery controller to determine with whom it can communicate, the StFS controller can register the host's information that it extracted from a Connect command that was sent to the discovery controller and store it in the root discovery controller database so it is available. Thus, regardless whether the host is manually configured with the IP Address of the root discovery controller or that IP Address is discovered via mDNS, when the host connects to the StFS, the StFS controller can create a record for that host by extracting data from the Connect command and the fabric connection used to transmit that command to the StFS. The extracted data may include information such as IP address, TCP port, entity type, host name, NQN, etc. Thus, embodiments may comprise extracting information from the Connect command and associated fabric connection for the host or subsystem, and other embodiments may comprise getting information from the host or subsystem and using that information to augment the registration. In one or more embodiments, if the host subsequently performs explicit registration, the registration will be augmented with any additional information that is provided, such as a symbolic name.

In NVMe-oF systems, before a host can discover an NVMe-oF NVM subsystem interface, the host needs to acquire the destination IP address of the subsystem interface that the host should use to establish a connection. To facilitate this discovery, a host may utilize a Centralized Discovery Controller (CDC). However, before the CDC can provide an IP address of the subsystem interface that the host should connect to, the subsystem interface typically must be registered with the CDC. This presents a challenge to some NVMe-oF subsystem implementations because for a subsystem to transmitting a registration request to the CDC requires functionality that is usually needed only on an NVMe host. As a result, subsystem implementations that lack such functionality are unable to perform a proper registration.

One approach to overcome discovery limitations of existing subsystems involves, rather than, for example, engaging in a cumbersome process of manually providing the subsystem interface IP addresses to the CDC, using the CDC to connect to the subsystem, pull the required information off that subsystem, and then use the obtained information to automatically register the appropriate subsystem interfaces. This method is referred to as a "pull" registration. One main challenge of using this approach is that the CDC first has to be notified that a pull registration is to be performed on the subsystem. Yet, in NVMe-oF subsystem implementations that have no of NVMe host function capabilities, there exist no suitable mechanisms for providing the required notification to facilitate the desired discovery. Various embodiments herein enable a DDC on an NVM subsystem to communicate a KDReq command and other discovery information to a CDC in order to trigger a pull registration and implicitly register with the CDC to facilitate full registration. Advantageously, this can be accomplished without requiring relatively basic DDC implementations to have to perform NVMe host functions to explicitly register with the CDC.

Figure 18:
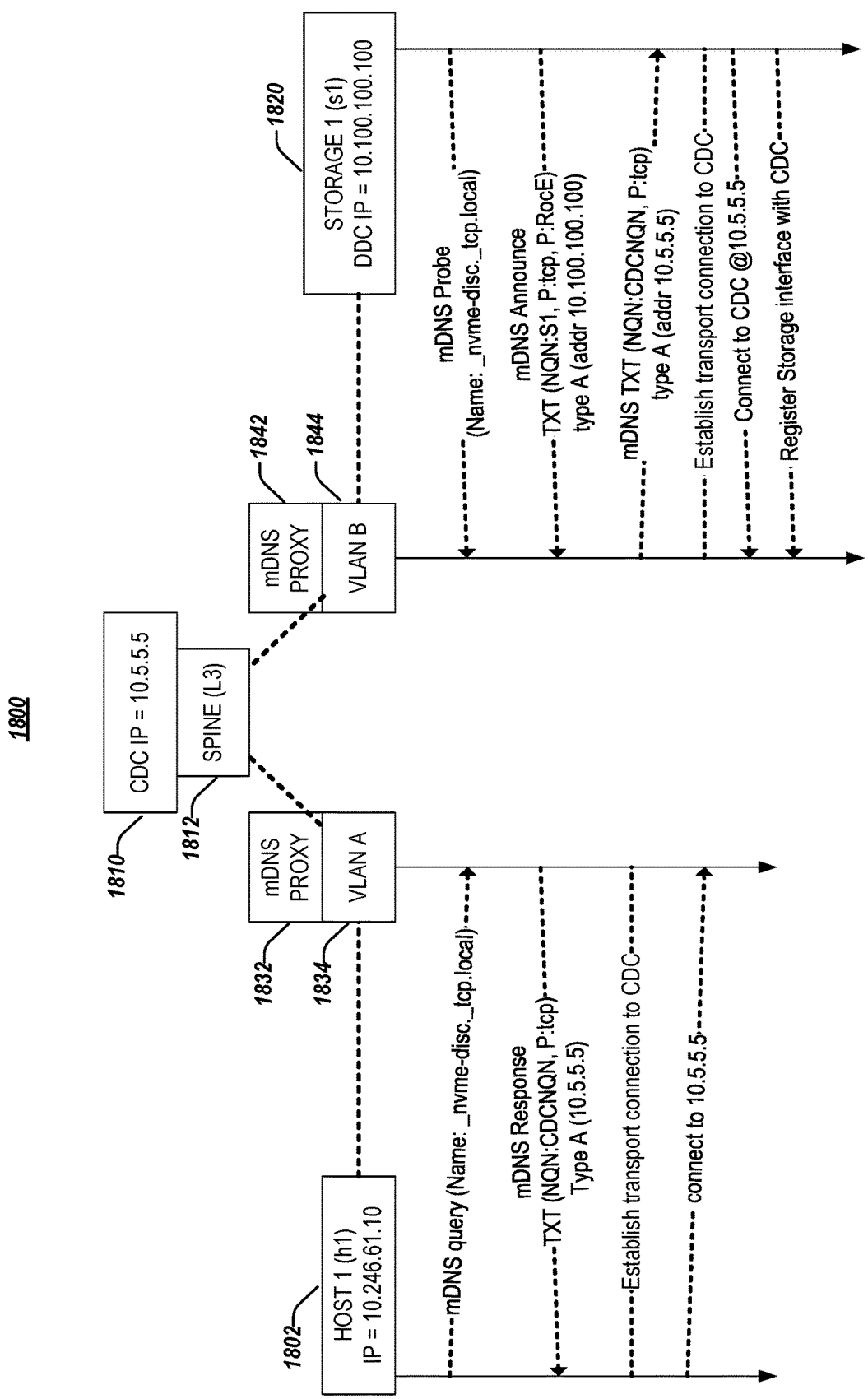
FIG. 18 depicts explicit registration in an exemplary NVMe-oF system according to embodiments of the present disclosure.

FIG. 18 depicts explicit registration operations in an exemplary NVMe-oF system. NVMe-oF system 1800 is implemented as an Ethernet L3 IP Storage Area Network (SAN) and comprises host 1802 and Storage 1820 that, in example in FIG. 18, are coupled via an L3 network that comprises CDC 1810. As depicted, host 1802 in FIG. 18 is communicatively coupled to VLAN A 1834 that may comprise mDNS proxy 1832. Similarly, Storage 1820, which represents an NVM storage subsystem, may be communicatively coupled to VLAN B 1844 that may comprise mDNS proxy 1842.

In operation, explicit registration comprises storage 1820 registering with CDC 1810 as a precondition to host 1802 being able to discover storage 1820 and communicate with respective interfaces on storage 1820. The process for storage 1820 to register with CDC 1810 involves storage 1820 initiating communication with CDC 1810 at VLAN A 1834 to discover the IP fabric interface address of CDC 1810. Storage 1820 may "listen" for a DNS-compatible responses from entities in other subsystems in the networks, if present, and send out on the network an mDNS protocol command, as shown in FIG. 18, e.g., to forestall a potential or actual conflict with the information about to be Announced by the storage 1820 that may be caused by duplicate IP addresses or other conditions. Once the Probe has been completed, the storage 1820 will Announce itself to other entities within the network that storage 1820 supports one or more specific services, including the _nvme-disc. service. By doing so, storage 1820 inquires whether any other entities are present in the network that support the _nvme-disc. service. It is noted that the general format and use of the mDNS protocol to facilitate probing in an NVMe environment using service types and subservice types is known in the art and described, e.g., in RFC 6762 and RFC 6763 which are incorporated herein by reference.

As shown in FIG. 18, in one or more embodiments, storage 1820 may send out, e.g., after successful completion of a probe, an mDNS Announce notification to advertise that storage 1820 supports certain services, subservices, service names and announce its resource records. An exemplary Announce message may comprise an NVMe Qualified Name (NQN) and the IP address for storage 1820, which the entities in network 1800 may use to contact storage 1820, or any other network information using any known network communication protocol in the art.

The mDNS proxy 1842, which can be implemented in VLAN B 1844 and is coupled to VLAN B 1844, may use the Announce notification and respond to it by announcing that CDC 1810 instance supports the presence of the _nvme-disc. service. The mDNS proxy 1842 can further provide network information, such as the IP address of CDC 1810.

In one or more embodiments, storage 1820 comprises built-in intelligence and/or certain host functionality that may allow storage 1820 to use the IP address of CDC 1810 to establish a transport connection (e.g., an NVMe-oF TCP connection) to CDC 1810, e.g., by sending an NVMe-oF connect command to the CDC IP address.

Once a connection to CDC 1810 has been established, storage 1820 can commence an explicit registration process, e.g., by sending out an explicit registration command to provide CDC 1810 with one or more pieces of registration information to ensure that storage ports of storage 1820 are discoverable by host 1802. See, e.g., U.S. patent application Ser. No. 16/820,547 FIG. 5 (filed Mar. 16, 2020). In this manner, NVMe-oF system 1800 utilizes functionality that is typically exhibited by NVMe hosts rather than by relatively simple passive storage subsystems or similar targets. In one or more embodiments, simpler storage subsystems that do not rely on the availability of NVMe host functionality may use a KDReq command, as described below with reference to FIG. 19.

E. IMPLICIT REGISTRATION EMBODIMENTS USING KICKSTART DISCOVERY

Figure 19:
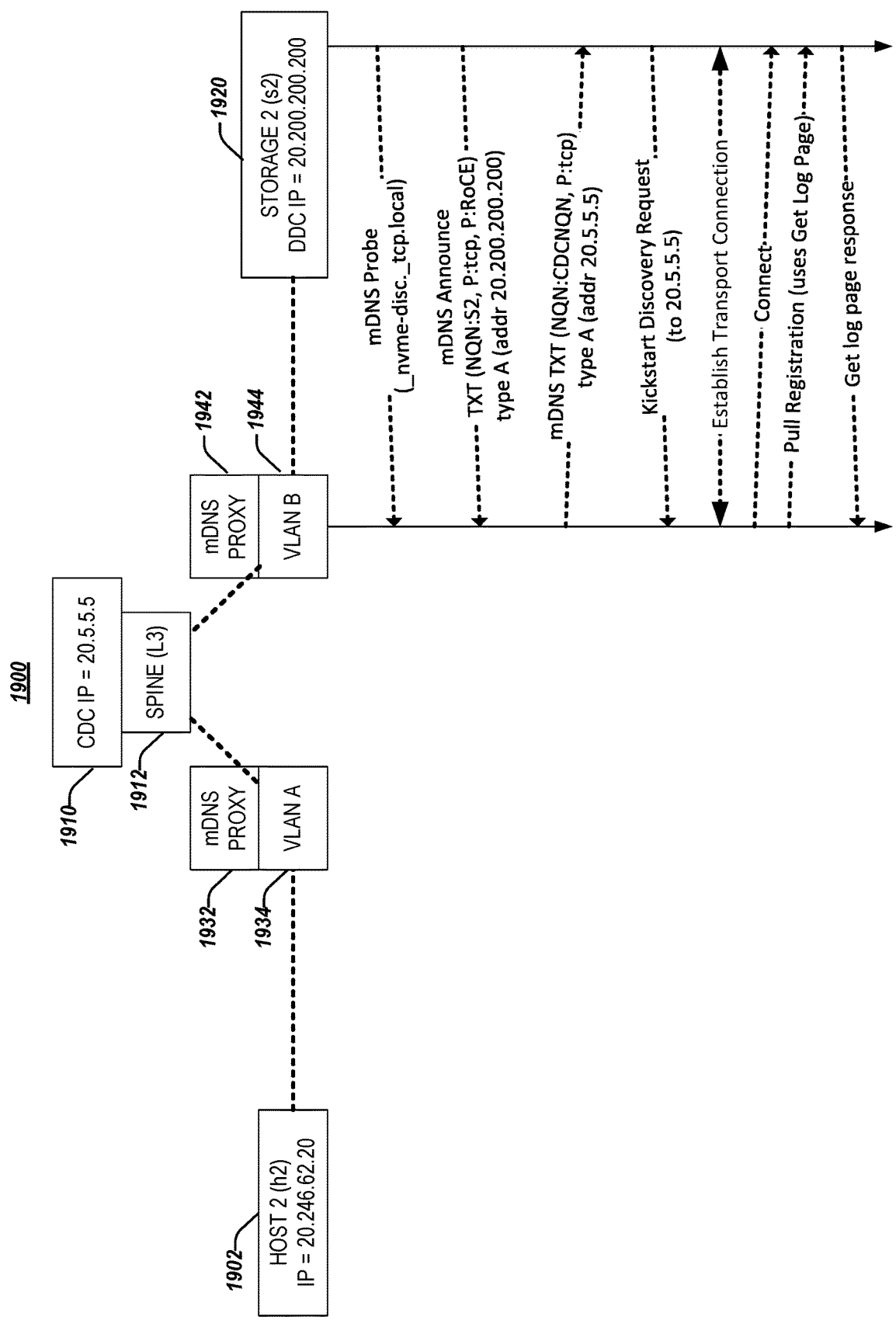
FIG. 19 depicts an exemplary pull registration process in an NVMe-oF system according to embodiments of the present disclosure.

FIG. 19 depicts an exemplary pull registration process in an NVMe-oF system according to embodiments of the present disclosure. Unlike storage 120 in FIG. 18, which illustrates explicit registration, DDC 1920 shown in FIG. 19 represents a relatively simple NVM storage subsystem, e.g., a basic storage device or storage array that may communicate a KDReq command to CDC 1910 to cause CDC 1910 to implicitly register one or more storage interfaces of DDC 1920 with a name server database of CDC 1910.

In operation, it is desirable that host 1902 be able to initiate communication with CDC 1910 to discover and communicate with respective interfaces on DDC 1920. In one or more embodiments, in response to DDC 1920 obtaining the IP address of CDC 1910, e.g., from an mDNS response by mDNS proxy 1942, DDC 1920 may communicate a command to CDC 1910 at the obtained IP address to request a pull registration, e.g., by transmitting a KDReq command to CDC 1910. Such a KDReq command may comprise, for example, the IP address of DDC 1920 and the NQN of DDC 1920 as two pieces of information that may aid CDC 1910 in connecting to DDC 1920, pulling discovery information, e.g., by using the contents of a get log page response from DDC 1920 and, ultimately, enabling CDC 1910 to use the obtained discovery information to implicitly register one or more storage interfaces of DDC 1920 with the name server database of CDC 1910.

In this manner, DDC 1920 may facilitate discovery by inviting CDC 1910 to connect to DDC 1920 to extract discovery information, advantageously, without requiring DDC 1920 to exhibit complex functionality that resembles the behavior of an NVMe host. However, since mDNS is an L2 multicast protocol that allows discovery of IP interfaces, such as those of host 1902 and storage 1920, within the same broadcast domain, without more, information is not forwarded across a routed boundary, causing this registration method to be suitable only in L2 fabrics where a CDC 1910 and DDC 1920 participate in the same broadcast domain. As a result, topologies that, for example, do not have an mDNS proxy such as mDNS proxy 1942, cannot properly operate in an L3 environment.

Various embodiments herein advantageously enable operation in L3 environments, even for less complex DDCs, such as those comprising Ethernet-attached bunch of flash (EBoF) drives (e.g., those having a single Ethernet connection) and allow discovery of CDCs present on a transport network without the need for explicit registration.

It is noted that the service names, commands, and the like used herein are not intended to be limited to the examples given. As one of skill in the art will appreciate, existing communication protocols and those developed in the future may equally benefit from the teachings according to the present disclosure.

Figure 20:
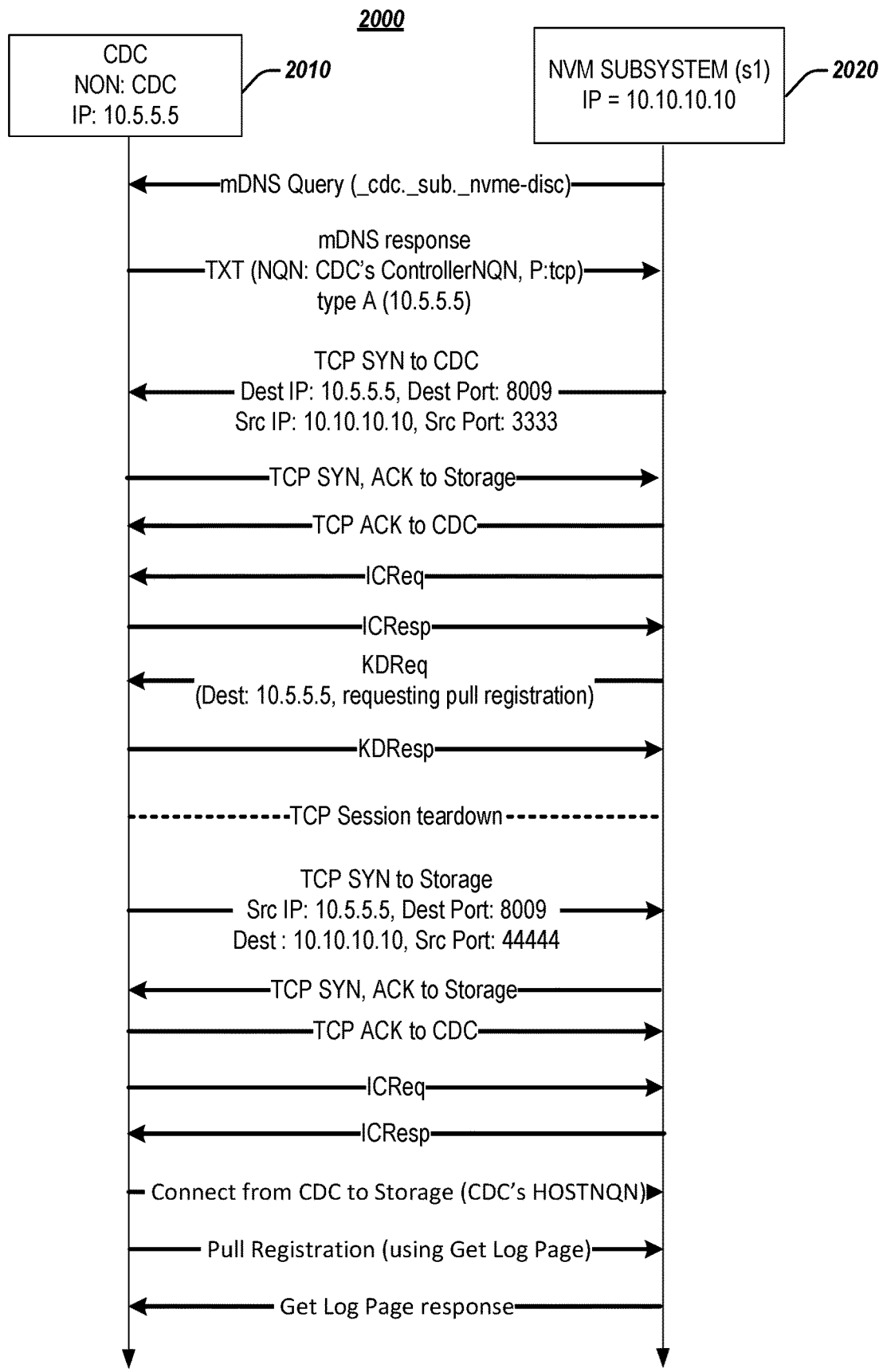
FIG. 20 depicts an exemplary pull registration process using a kickstart sequence according to embodiments of the present disclosure.

FIG. 20 depicts an exemplary pull registration process using a kickstart sequence according to embodiments of the present disclosure. As depicted in FIG. 20, in one or more embodiments, NVMe-oF system 2000 may comprise CDC 2010 and NVM subsystem 2020 that is communicatively coupled with CDC 2010. It is understood that NVM subsystem 2020 may represent any type of NVM storage subsystem known in the art and may comprise, for example, a storage array. Not shown are storage management interfaces and other components that a person of skill in the art would readily recognize as necessary or useful for the proper operation of an NVMe-oF system or network. Further, one of skill in the art will appreciate that each network entity may be communicatively coupled with any number of other entities or components not shown in FIG. 20.

In operation, in one or more embodiments, NVM subsystem 2020 may use a kickstart registration process that employs an mDNS protocol to communicate to CDC 2010 network information, which may enable a host (not shown in FIG. 20) coupled to CDC 2010 to establish a connection and access storage interfaces on NVM subsystem 2020 that the host is permitted to communicate with. In one or more embodiments, the kickstart registration process may commence, e.g., in a start-up phase, when NVM subsystem 2020 transmits to CDC 2010, and/or other entities that may be present in network NVMe-oF system 2000, one or more messages, such as an mDNS query according to the mDNS protocol, to indicate to other entities that NVM subsystem 2020 supports one or more services and/or subservices (e.g., a _cdcpull._sub._nvme-disc service) to inquire whether other entities support that service(s).

In one or more embodiments, CDC 2010 may view the query as a request that a pull registration be performed on various storage interfaces on NVM subsystem 2020 and may determine a number of such storage interfaces that CDC 2010 can connect to, e.g., to obtain network information that makes network interfaces on NVM subsystem 2020 discoverable to the host. In one or more embodiments, CDC 2010 may respond with an mDNS response, e.g., with an mDNS message that may comprise discovery information such as the CDC controller's NQN and the IP address of CDC 2010.

As depicted in FIG. 20, NVM subsystem 2020 may use an affirmative mDNS response by CDC 2010 that comprises the IP address of CDC 2010 (e.g., 10.5.5.5) to establish a transport connection with CDC 2010, e.g., by using a TCP session to exchange network information, such as destination port (e.g., 8009), source port (e.g., 33333), and source IP address information (e.g., 10.10.10.10) along with acknowledge signals and/or other network information according to any network communication protocol known in the art.

In one or more embodiments, once a transport connection between NVM subsystem 2020 and CDC 2010 has been established, in order to initialize an NVMe connection over which network information (e.g., NVMe/TCP parameters) may be passed, NVM subsystem 2020 may transmit a message (e.g., an ICReq Protocol Data Unit (PDU) according to various embodiments presented herein) to which CDC 2010 may respond with a corresponding Initialize Connection Response (ICResp) PDU, for example, to indicate acceptance of the connection request.

In one or more embodiments, the message may comprise information that indicates that a subsequent connection from NVM subsystem 2020 is an NVMe connection that enables communication of a KDReq command. In one or more embodiments, the NVMe-oF KDReq command sent by NVM subsystem 2020 (i.e., the device that initiated the ICReq PDU) serves as a signal for CDC 2010 to perform a pull registration on NVM subsystem 2020. In this manner, CDC 2010 need not send an NVMe-oF connect command immediately after exchanging ICReq and ICResp PDUs, for example, to initialize a controller function to enable a controller to properly accept subsequent commands, as part of the registration process. Advantageously, not having to initialize a controller function at this point simplifies the implementation of NVM subsystem 2020 in an NVMe-oF environment.

In one or more embodiments, CDC 2010 may use the TCP connection to respond to the KDReq command, e.g., by transmitting a corresponding NVMe-oF KDResp command, after which the TCP session may be torn down. Then, once CDC 2010 is ready to send a connect command to NVM subsystem 2020, e.g., to initialize a controller, CDC 2010 may initiate a new TCP transport session, e.g., using source port 44444 as shown in in FIG. 20, and transmit to NVM subsystem 2020 an ICReq PDU that may comprise information indicates that a subsequent connection from CDC 2010 comprises a NVMe-oF connect command. Once NVM subsystem 2020 responds with an ICResp PDU, and CDC 2010 sends the NVMe-oF connect command to NVM subsystem 2020 using the new TCP session, in one or more embodiments, CDC 2010 may transmit to NVM subsystem 2020 a request for information, such as a pull registration command that may specify a log page identifier that requests port-local Discovery Log Page Entries (DLPEs). In one or more embodiments, for example, the pull registration command may comprise a get log page command to elicit or pull from NVM subsystem 2020 discovery or network information, such as IP addresses of storage interfaces that the host may communicate with.

In one or more embodiments, NVM subsystem 2020 may respond to the pull registration command by providing to CDC 2010 the requested discovery information, e.g., in form of the contents of a get log page response record. In this manner, NVM subsystem 2020 may use the mDNS protocol and the pull registration process to register with CDC 2010 and become discoverable by the host. Advantageously, C D C 2010 may use some or all of the discovery information to perform implicit registration of the storage interfaces, e.g., with a name server database of CDC 2010 and without NVM subsystem 2020 requiring complex NVMe host functionality.

It is noted that the systems depicted in FIG. 20 are not limited to the constructional detail shown there or described in the accompanying text. For example, as those skilled in the art will appreciate, in one or more embodiments, CDC 2010 may be integrated with one or more CDC proxies that, in turn, may be integrated with one or more VLANs. A person of skill in the art will further appreciate that CDC 2010 may aggregate discovery information from any number of NVM subsystems.

An ICReq PDU command may be used, for example, by the CDC and NVM subsystem shown in FIG. 20 and/or any other entity in an NVMe-oF environment, e.g., by a host. In one or more embodiments, a KDReq/KDResp command may have a format that comprises an entry for one or more NVMe-oF KDReq/KDResp parameters. Each parameter may be associated with a predetermined byte range within the command and/or with a predetermined section therein, such as a header field. It is noted that formats and/or locations for parameters may vary, e.g., depending on the standard of the used communication protocol without deviating from the objectives of the present disclosure.

In one or more embodiments, a value associated with the KDReq/KDResp parameter may indicate whether the connection being established will be used to transport KDReq and KDResp commands. For example, a bit value of "1" may indicate that the connection being established will be used to transport KDReq and KDResp commands, conversely, a bit value of "0" may indicate that the connection being established will be used to transport a connect command. A person of skill in the art will appreciate that commands may comprise any number of different and/or additional fields, entries, and/or parameters that may be arranged in any suitable format and may have different sizes.

Figure 21:
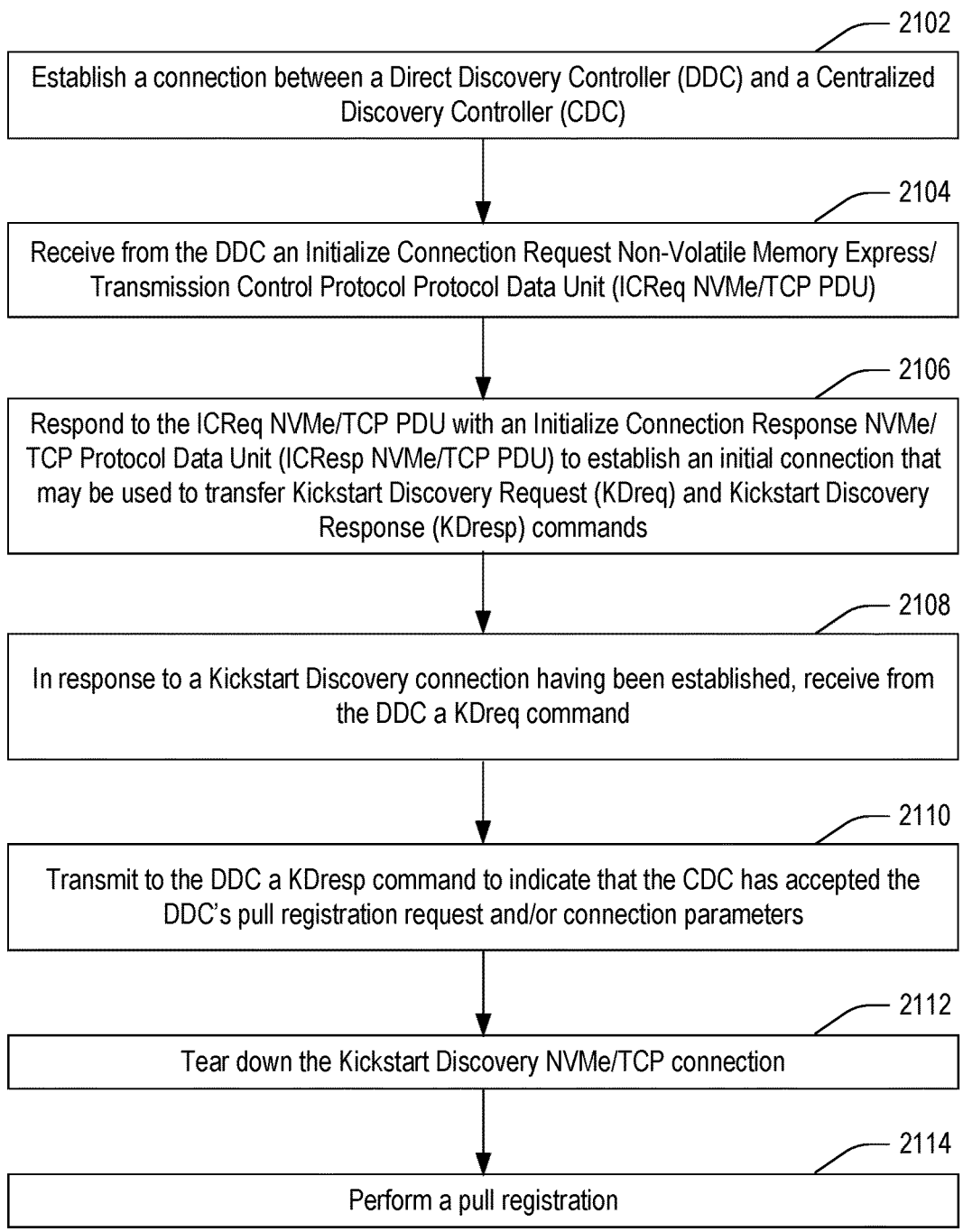
FIG. 21 is a flowchart depicting an exemplary kickstart discovery request (KDReq) and kickstart discovery response (KDResp) sequence between a direct discovery controller (DDC) and a CDC according to embodiments of the present disclosure.

FIG. 21 is a flowchart depicting an exemplary KDReq and KDResp sequence between a DDC and a CDC according to embodiments of the present disclosure. Although sequence 2100 in FIG. 21 is given in the context of a communication for establishing a TCP connection between a DDC and a CDC, it is understood that sequence 2100 may be used for communication between a controller and a NVM subsystem and/or any other entity in an NVMe-oF environment.

In one or more embodiments, the CDC may act as the passive side of the TCP connection and may be set to listen, e.g., for DDC-initiated TCP connection establishment requests. The IP address used by the DDC to establish the TCP connection with the CDC may be obtained, e.g., from an A record or an AAAA record that may be provided in an mDNS response from the CDC.

In one or more embodiments, sequence may start by establishing (2102) a TCP connection between the DDC and the CDC. Once the CDC receives (2104) one or more ICReq NVMe/TCP PDUs from the DDC, such as ICReq PDUs discussed above with reference to FIG. 20, the CDC may respond (2106) with one or more ICResp NVMe/TCP PDUs to establish an initial connection that may be used to transfer KDReq and KDResp.

Once an initial connection has been established, the CDC may receive (2108) from the DDC one or more KDReq commands, and the CDC may respond (2110) to the DDC by transmitting one or more KDResp commands to indicate that the CDC has accepted the DDC's pull registration request and/or connection parameters. In one or more embodiments, the KDResp command sent by the CDC may comprise the NQN of the CDC, e.g., in a CDCNQN field that uniquely identifies the CDC.

In one or more embodiments, once the DDC receives the KDResp command from the CDC, the initial connection may be torn down (2112). Finally, the CDC may perform a pull registration (2114) with the DDC according to the previously mentioned methods, e.g., by using one or more connection parameters that the CDC has obtained from the KDReq command. It is understood that the sequence in FIG. 21 may be used for both establishing a connection and exchanging connection configuration parameters.

In one or more embodiments, ICResp NVMe/TCP PDU(s) may comprise a KDReq/KDResp bit (e.g., in a flags field) that if set to "0," may cause the first capsule exchange between the DDC and the CDC to comprise an NVMe-oF connect request/response sequence. Contrariwise, if the KDReq/KDResp bit in the ICReq NVMe/TCP PDU is set to "1," the first capsule exchange may comprise an NVMe-oF KDReq/KDResp sequence.

It is understood that an ICReq NVMe/TCP PDU may comprise any number and combination of sections, fields, and other data structures, such as headers and data sections for parameters, to hold parameters and other network-related information that may have differing functions, e.g., data alignment, record identifiers, length identifiers, and other descriptors or formats. It is further understood that any such data structures may have differing lengths and may be arranged in any suitable order, e.g., having values in predetermined ranges such as to comply with formatting and other requirements of certain network protocols.

For example, in one or more embodiments, a KDReq command may comprise fields for parameters, such as a type, a length, any flags, an NVMe transport type, an address family, a transport service identifier, a transport address, any reserved parameters, and any "kickstart record" parameters, e.g., including the number of kickstart records in the command. A kickstart record, may comprise any number of descriptors or fields that may comprise information that should be communicated, for example, to a CDC to enable the CDC to connect to a subsystem and transmit a Get Log Page message and request port-local DLPEs to perform implicit registration as previously discussed with reference to FIG. 20.

In one or more embodiments, a kickstart record descriptor may be used to identify transport type, an address family, and other parameters associated with NVMe registration. Similarly, in one or more embodiments, a KDResp command may comprise any number and type of sections and fields. Exemplary fields comprise a kickstart status field that that may identify whether a kickstart has been successful or whether kickstart has failed, i.e., indicating that a pull registration will not be performed. In addition, in one or more embodiments, a "failure reason" field comprising a failure reason code or similar information may be utilized, for example, to identify a failure based on the validity of values in one or more fields, or to identify any of a number of possible reasons for non-performance.

In operation, if a bit in the header section of a KDResp command is set to "1," it may indicate, for example, that kickstart has failed. As a result, a CDC may be prevented from executing a pull registration, e.g., based on a reason indicated in the failure reason field. Exemplary failure reasons may comprise (1) the failure of a transport service identifier to match an NVMe transport type as defined in a transport service identifier field; (2) the failure of a transport address to match an address family as defined in an address family field; (3) an invalid address family; and (4) an invalid transport type. It is understood that additional or different reasons, e.g., reasons that comprise more detailed and/or different information, may be utilized.

Further, it is understood that different or additional kickstart record fields may comprise different or additional information that may be used to facilitate a pull registration and that any number of parameters may be defined by existing or future communication protocols.

F. SYSTEM EMBODIMENTS

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 22:
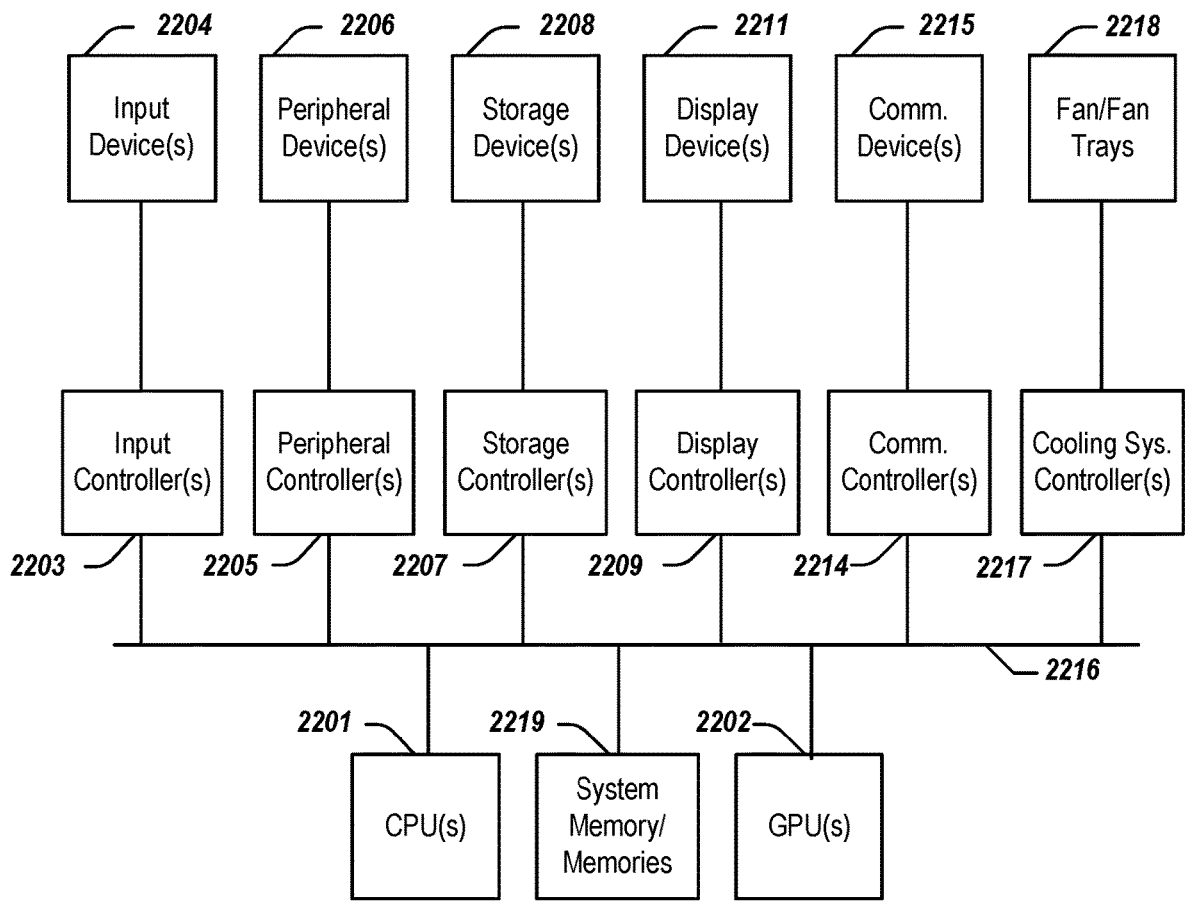
FIG. 22 depicts a simplified block diagram of an information handling system, according to embodiments of the present disclosure.

FIG. 22 depicts a simplified block diagram of an information handling system (or computing system), according to embodiments of the present disclosure. It will be understood that the functionalities shown for system 2200 may operate to support various embodiments of a computing system—although it shall be understood that a computing system may be differently configured and include different components, including having fewer or more components as depicted in FIG. 22.

As illustrated in FIG. 22, the computing system 2200 includes one or more central processing units (CPU) 2201 that provides computing resources and controls the computer. CPU 2201 may be implemented with a microprocessor or the like and may also include one or more graphics processing units (GPU) 2202 and/or a floating-point coprocessor for mathematical computations. In one or more embodiments, one or more GPUs 2202 may be incorporated within the display controller 2209, such as part of a graphics card or cards. The system 2200 may also include a system memory 2219, which may comprise RAM, ROM, or both.

A number of controllers and peripheral devices may also be provided, as shown in FIG. 22. An input controller 2203 represents an interface to various input device(s) 2204, such as a keyboard, mouse, touchscreen, and/or stylus. The computing system 2200 may also include a storage controller 2207 for interfacing with one or more storage devices 2208 each of which includes a storage medium such as magnetic tape or disk, or an optical medium that might be used to record programs of instructions for operating systems, utilities, and applications, which may include embodiments of programs that implement various aspects of the present disclosure. Storage device(s) 2208 may also be used to store processed data or data to be processed in accordance with the disclosure. The system 2200 may also include a display controller 2209 for providing an interface to a display device 2211, which may be a cathode ray tube (CRT) display, a thin film transistor (TFT) display, organic light-emitting diode, electroluminescent panel, plasma panel, or any other type of display. The computing system 2200 may also include one or more peripheral controllers or interfaces 2205 for one or more peripherals 2206. Examples of peripherals may include one or more printers, scanners, input devices, output devices, sensors, and the like. A communications controller 2214 may interface with one or more communication devices 2215, which enables the system 2200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2200 comprises one or more fans or fan trays 2218 and a cooling subsystem controller or controllers 2217 that monitors thermal temperature(s) of the system 2200 (or components thereof) and operates the fans/fan trays 2218 to help regulate the temperature.

In the illustrated system, all major system components may connect to a bus 2216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 23:
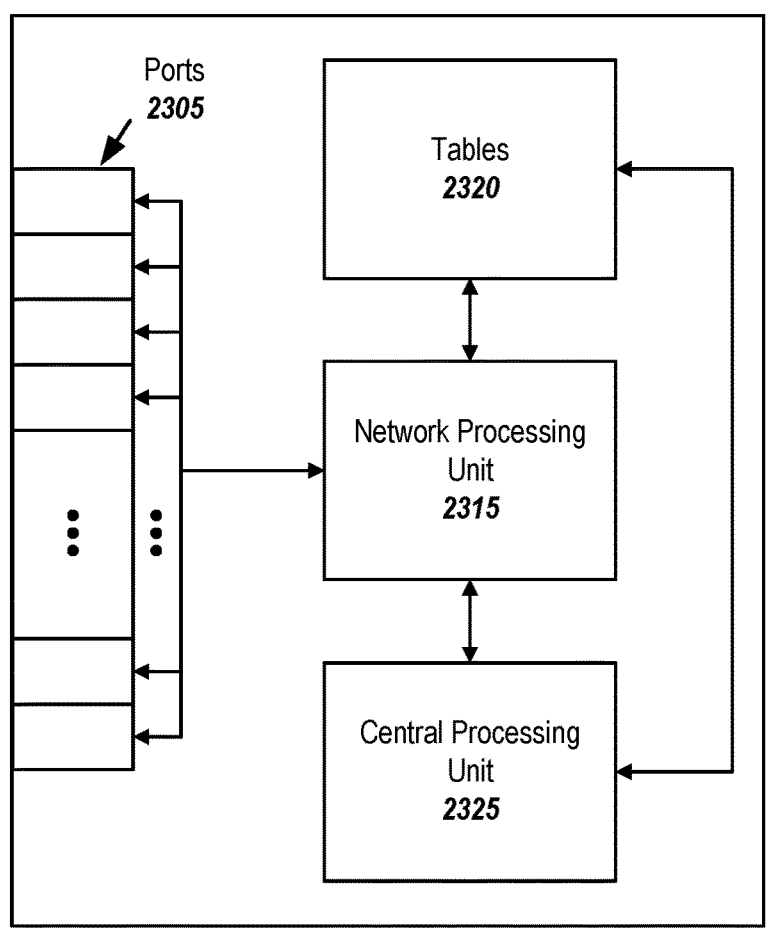
FIG. 23 depicts an alternative block diagram of an information handling system, according to embodiments of the present disclosure.

FIG. 23 depicts an alternative block diagram of an information handling system, according to embodiments of the present disclosure. It will be understood that the functionalities shown for system 2300 may operate to support various embodiments of the present disclosure although it shall be understood that such system may be differently configured and include different components, additional components, or fewer components.

The information handling system 2300 may include a plurality of I/O ports 2305, a network processing unit (NPU) 2315, one or more tables 2320, and a central processing unit (CPU) 2325. The system includes a power supply (not shown) and may also include other components, which are not shown for sake of simplicity.

In one or more embodiments, the I/O ports 2305 may be connected via one or more cables to one or more other network devices or clients. The network processing unit 2315 may use information included in the network data received at the node 2300, as well as information stored in the tables 2320, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented registration method for non-volatile memory express over Fabric (NVMe-oF) systems, the method comprising:
sending to a centralized discovery controller a multicast Domain Name System (mDNS) communication that comprises information about subsystem interfaces on a port, the subsystem interfaces being associated with an unregistered IP address;
receiving at the port from the centralized discovery controller a request for information associated with a set of subsystem interfaces that are accessible via the port; and
sending to the centralized discovery controller (CDC) discovery information that enables a host to access at least a subset of the set of subsystem interfaces.

2. The computer-implemented registration method of claim 1, further comprising, prior to receiving the request for information, transmitting to the CDC an initialize connection request protocol data unit that indicates that a subsequent connection enables communication of a kickstart discovery request command that serves as a signal for the CDC to perform a pull registration.

3. The computer-implemented registration method of claim 1, wherein the mDNS communication is at least one of an mDNS response or an mDNS Announce message.

4. The computer-implemented registration method of claim 1, wherein the CDC comprises a CDC proxy that is implemented in a Virtual Local Area Network (VLAN) and establishes a connection between the host and the at least some of the subsystem interfaces.

5. The computer-implemented registration method of claim 1, wherein the request for information is received in response to a connection from the CDC being established.

6. The computer-implemented registration method of claim 1, wherein the request for information comprises a Get Log Page command.

7. The computer-implemented registration method of claim 1, wherein the mDNS communication is used to determine uniqueness of one or more records.

8. The computer-implemented registration method of claim 1, wherein the mDNS communication indicates a link update or a network connectivity status change.

9. A non-transitory computer-readable medium or media comprising one or more sequences of instructions which, when executed by at least one processor, causes steps to be performed comprising:
responsive to receiving a multicast Domain Name System (mDNS) communication from a non-volatile memory (NVM) subsystem that supports responding to a request for information about subsystem interfaces on a port and that comprises an unregistered IP address, establishing a connection with the NVM subsystem;
sending the request for information to a port of the NVM subsystem to obtain discovery information associated with a set of subsystem interfaces that are accessible via the port; and
receiving the discovery information associated with the set of subsystem interfaces, the discovery information enabling a host to access at least a subset of the set of subsystem interfaces.

10. The non-transitory computer-readable medium or media of claim 9, wherein the mDNS communication is at least one of an mDNS response or an mDNS Announce message, the mDNS response being sent in response to an mDNS query.

11. The non-transitory computer-readable medium or media of claim 9, wherein a direct discovery controller of the NVM subsystem is communicatively coupled with a centralized discovery controller to perform implicit registration of the subset with a name server database.

12. The non-transitory computer-readable medium or media of claim 9, wherein the request for information is sent in response to a connection to a direct discovery controller being established.

13. The non-transitory computer-readable medium or media of claim 12, further comprising, prior to sending the request for information, receiving from the direct discovery controller an initialize connection request protocol data unit that indicates that a subsequent connection enables communication of a kickstart discovery request command.

14. The non-transitory computer-readable medium or media of claim 13, wherein the kickstart discovery request command serves as a signal to perform a pull registration on the direct discovery controller.

15. The non-transitory computer-readable medium or media of claim 9, wherein the request for information comprises a Get Log Page command.

16. A registration system for a non-volatile memory express over Fabric (NVMe-oF) system, the system comprising:
a centralized discovery controller (CDC) communicatively coupled to a host and to a non-volatile memory (NVM) subsystem comprising a direct discovery controller (DDC) and a set of storage interfaces, the CDC performs steps comprising:
responsive to receiving a multicast Domain Name System (mDNS) communication from the NVM subsystem that supports responding to a request for information about subsystem interfaces on a port of the NVM subsystem and that comprises an unregistered IP address, establishing a connection with the direct discovery controller;
transmitting to the CDC an initialize connection request protocol data unit that indicates that a subsequent connection enables communication of a kickstart discovery request command;
sending the request for information to the port to obtain discovery information associated with a set of subsystem interfaces that are accessible via the port; and
receiving the discovery information associated with the set of subsystem interfaces, the discovery information enables enabling the host to access at least a subset of the set of subsystem interfaces.

17. The registration system of claim 16, wherein the CDC comprises a discovery controller proxy that is implemented in a Virtual Local Area Network (VLAN) and establishes a connection between the host and the at least some of the subsystem interfaces of the NVM subsystem.

18. The registration system of claim 17, wherein the CDC sends the request for information in response establishing a connection to the DDC, the request for information eliciting the discovery information.

19. The registration system of claim 16, wherein the CDC is communicatively coupled with the DDC to implicitly register the subset with a name server database.

20. The registration system of claim 16, wherein the discovery information identifies the set of storage interfaces associated with the NVM subsystem.

* * * * *